United States Patent [19]

Ito et al.

[11] Patent Number: 5,715,221
[45] Date of Patent: Feb. 3, 1998

[54] METHOD FOR MANAGING DEFECTS IN AN INFORMATION RECORDING MEDIUM, AND A DEVICE AND INFORMATION RECORDING MEDIUM USING SAID METHOD

[75] Inventors: Motoshi Ito; Takahiro Nagai, both of Osaka; Hiroshi Ueda, Nara, all of Japan

[73] Assignee: Matsushita Electric Industrial, Osaka-fu, Japan

[21] Appl. No.: 630,610

[22] Filed: Apr. 10, 1996

[30] Foreign Application Priority Data

Apr. 21, 1995 [JP] Japan .................. 7-096401

[51] Int. Cl.⁶ ........................................ G11B 7/00
[52] U.S. Cl. ........................... 369/54; 369/58
[58] Field of Search ................... 369/54, 58, 32, 369/47, 48

[56] References Cited

U.S. PATENT DOCUMENTS

| | | | |
|---|---|---|---|
| 5,111,444 | 5/1992 | Fukushima et al. | 369/54 |
| 5,112,444 | 5/1992 | Fukushima et al. | 369/58 |
| 5,235,585 | 8/1993 | Bish et al. | 369/54 |
| 5,303,219 | 4/1994 | Kulakowski et al. | 369/54 |

FOREIGN PATENT DOCUMENTS

| | | |
|---|---|---|
| 63-48662 | 3/1988 | Japan . |
| 25265 | 1/1990 | Japan . |
| 287369 | 3/1990 | Japan . |
| 2230558 | 9/1990 | Japan . |
| 554547 | 3/1993 | Japan . |
| 5135502 | 6/1993 | Japan . |

OTHER PUBLICATIONS

ANSI X3B11/94-154 5th Draft (ANSI Standard).
ISO/IEC 10090: 1992 (E) (ISO Standard).

*Primary Examiner*—Nabil Hindi
*Attorney, Agent, or Firm*—Price, Gess & Ubell

[57] ABSTRACT

A defect list (FIG. 12B) on an information recording medium only includes pairings (A1 and A2, B1 and B3 in FIG. 12B) of addresses of defective sectors belonging to the data sector area and addresses of non-defective sectors which belong to the spare sector area and which are to be used to replace the defective sectors, so that information relating to spare sectors which become defective (B2 in FIG. 12B) is not recorded in the list.

26 Claims, 24 Drawing Sheets

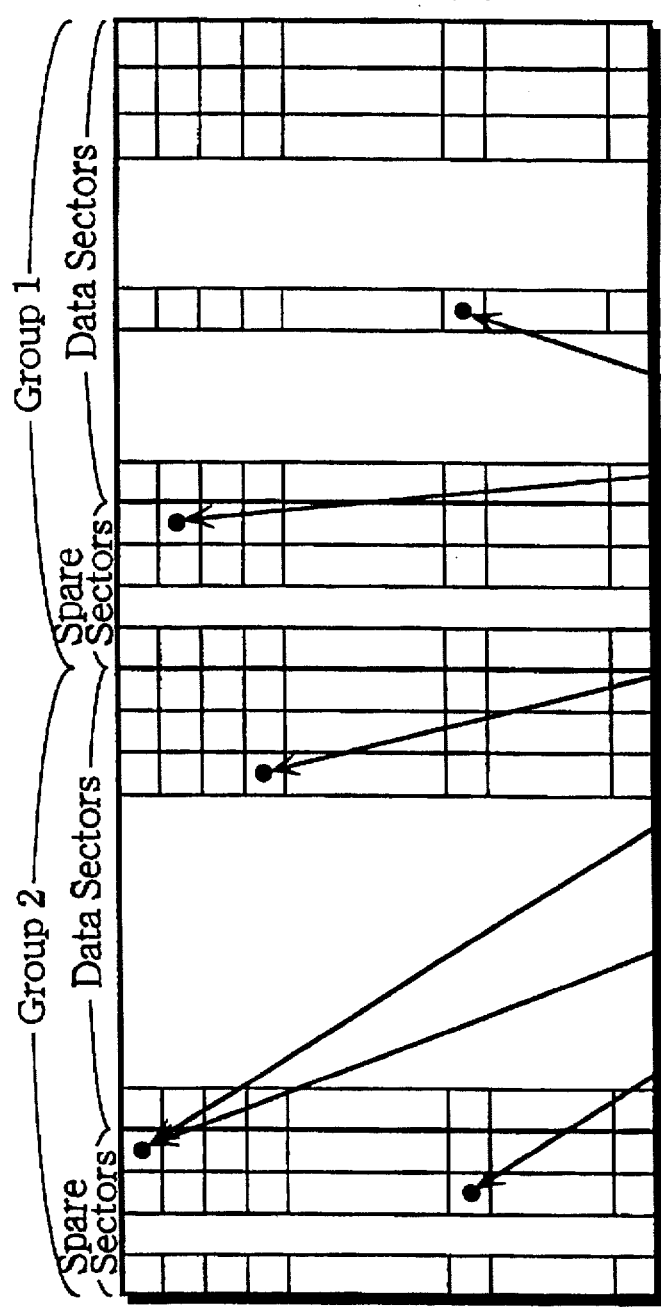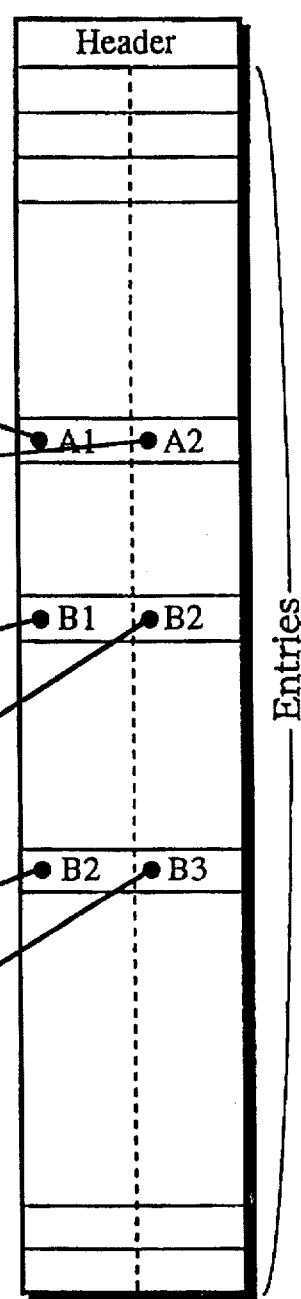
PRIOR ART
FIG. 5A
PRIOR ART
FIG. 5B

FIG. 21A
Rewritable Zone
FIG. 21B
SDL
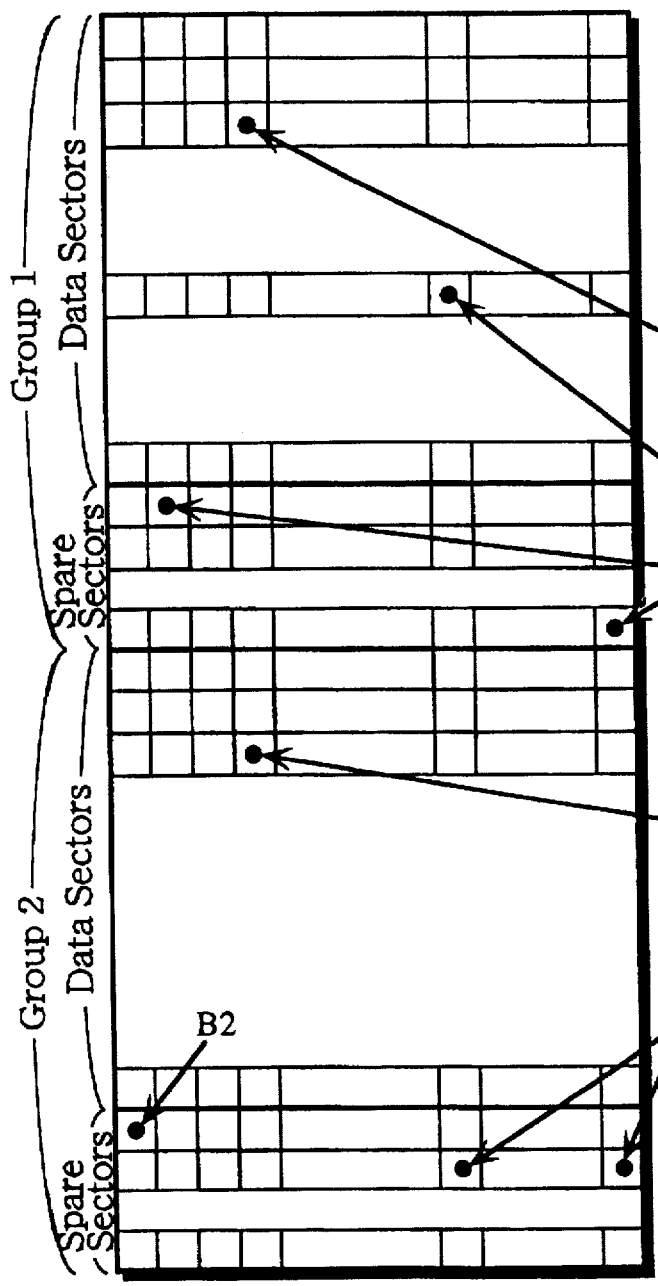
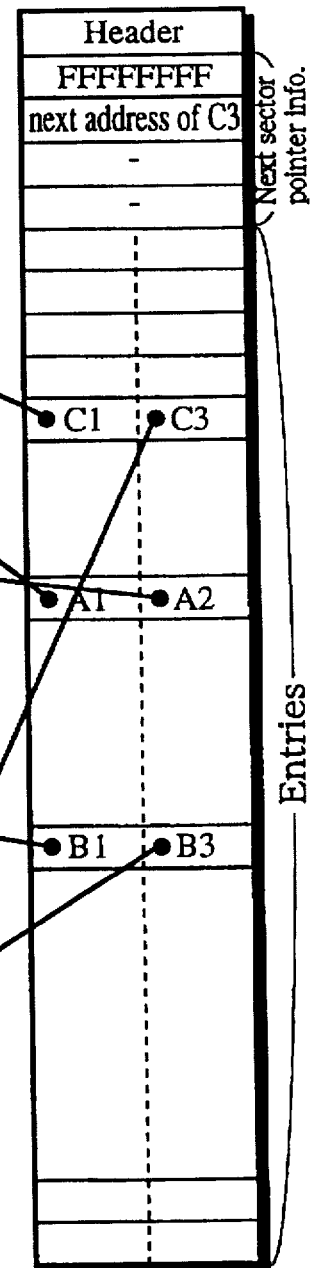

FIG. 23A
Rewritable Zone
FIG. 23B
SDL
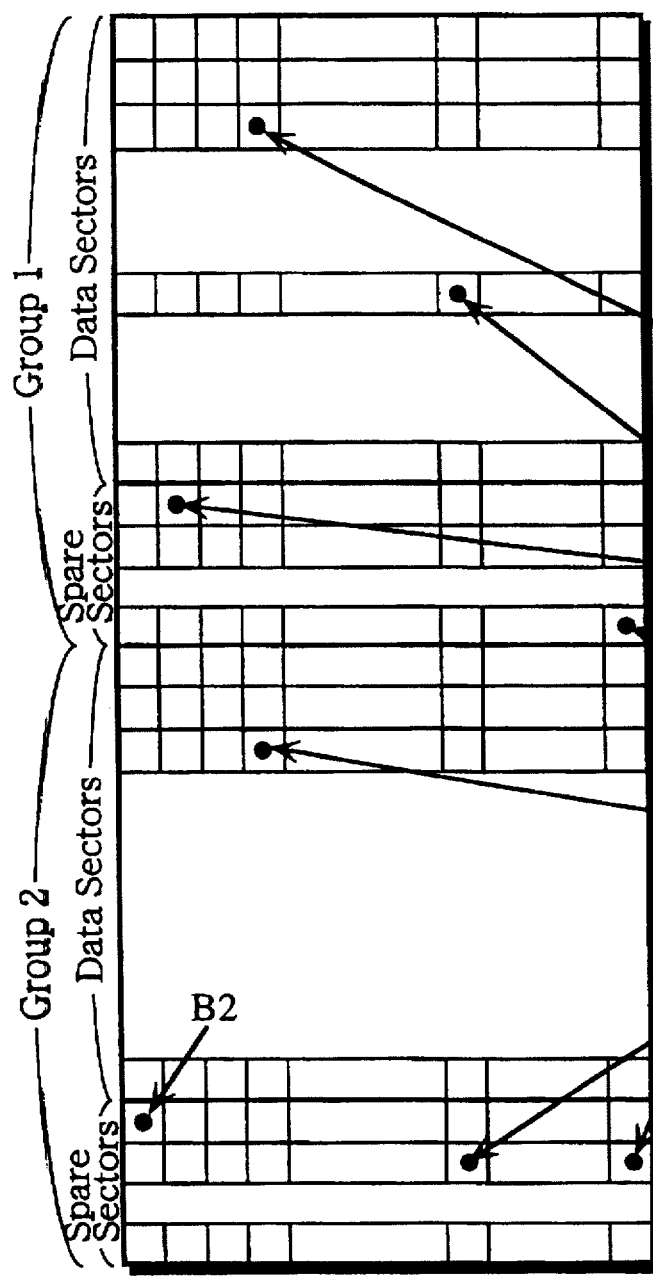
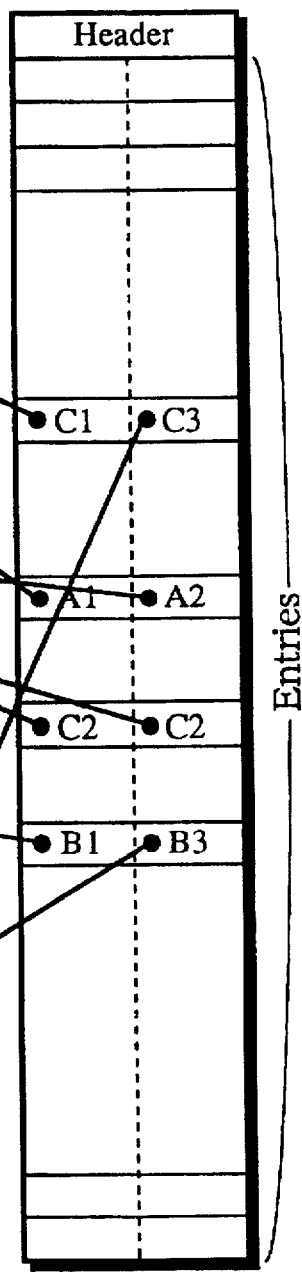

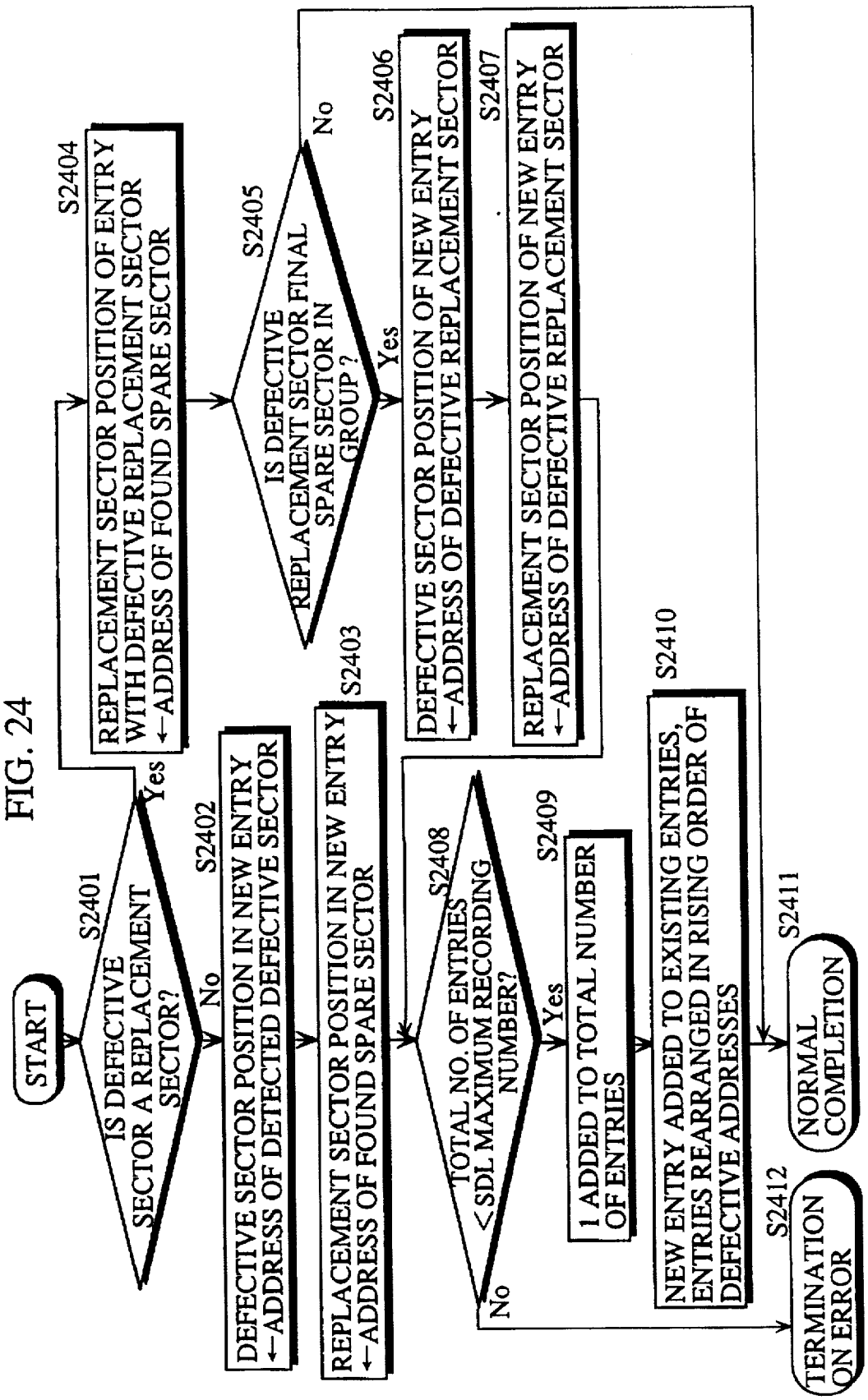

METHOD FOR MANAGING DEFECTS IN AN INFORMATION RECORDING MEDIUM, AND A DEVICE AND INFORMATION RECORDING MEDIUM USING SAID METHOD

BACKGROUND OF THE INVENTION

1. Field of the Invention

The present invention relates to a method for managing defects which arise in an information recording medium, such as an optical disk, and to a device and an information recording medium for realizing said method. This invention especially relates to defect management for information recording media which suffer from a deterioration in quality due to cyclic recording.

2. Description of the Prior Art

In recent years, information recording/reproduction devices which handle large-capacity rewritable information storage media have been increasingly used as auxiliary storage devices for host computers. In particular, optical disk devices, which enable the recording and reproduction of information by having fine pits formed on the surface of optical disks by a laser, are well-suited to large-capacity rewritable information storage. An example of a conventional computer system which uses such an optical disk is shown in FIG. 1.

However, such optical disks suffer from defects in their recording surface, so that a byte error rate (BER) of $10^{-4}$ should be supposed for such disks. This byte error rate can be suppressed to below $10^{-12}$ by attaching error correction codes to the stored information, although this presupposes that the defects are randomly distributed across the disk, so that burst errors can also occur when the limit of error correction is exceeded. In such a situation, defect management is performed so as to exchange the location where the limit of error correction is exceeded for a better location. The two conventional methods of defect management used by conventional optical disk devices are explained below.

The first conventional method is used by 90 mm optical disks of International Organization for Standardization (ISO) 10090 Standard (hereinafter, ISO Standard). The layout of such optical disks is described in Chapter 18 of the ISO Standard. Here, a layout drawing of the data zone of an optical disk according to Table 5 of the ISO Standard is shown in FIG. 2A. This layout drawing expresses each track in the data zone of the optical disk shown in FIG. 3 in table form.

In FIG. 2A, the areas shown as DMA (Defect Management Area) 1–4 are the areas which store the information relating to defect management. Here, the same information is stored in each of DMA 1–4, with this being to protect against the occurrence of defects in DMA 1–4 themselves.

FIG. 2B is a drawing showing the elements which make up each DMA. Here, the DDS (Disk Definition Sector) stores information related to the partitions of the rewritable zone which will be explained below. The PDL (Primary Defect List) and SDL (Secondary Defect List) are defect lists for recording the positions of defective sectors. Here, the sectors recorded in the PDL are subjected to a sector slipping algorithm while the sectors recorded in the PDL are subjected to a linear replacement algorithm. It should be noted here that, as shown in FIG. 3, each track is divided beforehand into a predetermined number of parts and that the position of each sector is specified by using an address which is unique to that sector.

FIG. 2C is a partition figure for the rewritable zone as given in Table 6 of the ISO Standard. Here, the rewritable zone is divided into a number of groups, each of which is made up of a plurality of data sectors and a plurality of spare sectors. These groups are the units for defect management. Under this method, the fundamental principle is that any of the spare sectors in a same group is used to replace a data sector which is judged to be defective.

Defect management methods for optical disks are described in Chapter 19 of the ISO Standard. Of these, the following explanation will especially focus on the linear replacement algorithm using an SDL. The composition of the SDL is shown in FIG. 4, with this being a simplified version of Table 12 in the ISO Standard. In FIG. 4, SDL 400 is made up of header 401 and a plurality of entries 402. Here, header 401 is made up of a descriptor showing that the data is SDL data and information such as the number of entries in the SDL. Each entry is made up of a pair of storage entries which are composed of area 403 which stores the position of a defective sector and area 404 which stores the position of the spare sector (called the replacement sector) which is used to replace the corresponding defective sector.

FIGS. 5A and 5B show conception figures of the linear replacement algorithm. In FIG. 5A, a layout figure of the rewritable zone is shown. In this figure, each row corresponds to one track on the optical disk, with each small square in the rows corresponding to one sector. Here, the rewritable zone is divided into two groups named Group1 and Group2. As mentioned above, each group is made up of a plurality of data sectors and a plurality of spare sectors. In this figure, the sectors marked with black circles are named sector A1, sector A2, sector B1, sector B2 and sector B3.

FIG. 5B shows the content of the SDL. In this figure three entries are shown. These are composed of information showing the replacement of sector A1 with sector A2, information showing the replacement of sector B1 with sector B2 and information showing the replacement of sector B2 with sector B3.

If, when the above information is recorded in SDL, the host computer requests access to sector A1, the optical disk device is set so as to access sector A2 in place of sector A1. In the same way, if the host computer requests access to sector B1, the optical disk device is set so as to access sector B3 in place of sector B1. In the latter example, the optical disk device interprets the information in SDL so as to replace sector B1 with sector B2 and subsequently to replace sector B2 with sector B3. This kind of list construction for the SDL is called a chaining method.

Here, recording/reproduction methods for optical disks can be roughly divided into a magneto-optical method and a phase change method. The ISO Standard described above applies to optical disks which use the magneto-optical method. Here, the magneto-optical method and the phase change method have their own advantages and disadvantages, with the advantages and disadvantages of the phase change method being the opposite of the magneto-optical method.

The advantage of the magneto-optical method is that there is no deterioration of the disc due to cyclic recording. The disadvantages are that it is always necessary to perform an erasing operation before performing a recording operation using magnetic fields in addition to light and that is necessary to detect the polarization angle for reproduction.

The advantages of the phase change method are that so long as a laser is provided, a recording operation can be performed without first performing an erasing operation for the disk and that a same detection technique as a CD (Compact Disc) player can be used. The disadvantage of this method is that cyclic recording causes deterioration in the quality of the disk, so that it is normal under this technique to prepare more spare sectors than under the magneto-optical method.

The second conventional method of defect management is a method which uses ANSI X3B11/94-154 5th Draft Standard (hereinafter, ANSI Standard) for 130 mm phase change optical disks. Here, the differences between the ANSI Standard and the ISO Standard lie in the list construction of the SDL. These points are described in Chapter 17, Paragraph 3 "Linear Replacement Algorithm" in the ANSI Standard. Here, a direct pointer method is used in the list construction of the SDL so that when a replacement sector becomes defective, a new entry which includes a flag (FFFFFFFF in hexadecimal) for the replacement sector position 404 of SDL is generated.

FIGS. 6A and 6B show conception figures for the linear replacement algorithm under ANSI Standard. Here, the layout of the rewritable zone shown in FIG. 6A is the same as FIG. 5A. The content of the SDL is shown in FIG. 6B. As shown in this figure, information showing the replacement of sector A1 with sector A2, information showing the replacement of sector B1 with sector B3 and information showing that sector B2 has become defective is recorded.

If, when the above information is recorded in SDL, the host computer requests access to sector A1, the optical disk device is set so as to access sector A2 in place of sector A1. In the same way, if the host computer requests access to sector B1, the optical disk device is set so as to access sector B3 in place of sector B1. As can be seen, under the direct pointer method, the same result as the chaining method can be achieved without the optical disk device interpreting the information so as to replace sector B1 with sector B2 and then replace sector B2 with sector B3.

The following is an explanation of the process for the optical disk device in assigning a replacement sector when it is determined that the sector to which the host computer requests access is defective, for both the ISO Standard and the ANSI Standard. A flowchart showing the process for assigning a replacement sector is shown in FIG. 7.

First, optical disk device 102 searches for a usable spare sector (step S701). If, as a result, a spare sector is available, the SDL is updated (steps S702, S703) and the process is completed as normal (step S704), while if no spare sector is available, the process is terminated with an error (steps S702, S705).

FIG. 8 is a flowchart showing the search process for a usable spare sector, with this flowchart being used in the following explanation to describe the details of step S701 in FIG. 7. It should be noted here that in both ISO Standard and ANSI Standard, a basic principle is used whereby spare sectors in a same group as a defective sector are used as replacement sectors in order of their addresses starting with the lowest address. Here, once all of the spare sectors in a group have been used, a spare sector in another group can be used.

First, optical disk device 102 sets the group which contains the defective sector as the group to have its spare sectors searched (step S801). Next, a spare sector with a highest address, out of the spare sectors which have already been used as replacement sectors, is retrieved from the SDL (step S802), and a spare sector which has a next address after the retrieved sector is set as a usable spare sector candidate for the replacement sector of the defective sector (step S803).

Next, it is determined whether the sector set as a candidate is a sector in the spare area (step S804), with the process being completed as normal when it is in the spare area (step S808). On the other hand, when the sector is not in the spare area, this means that the replacement sector which was found in step S802 is the final spare sector in the group, or moreover that there are no usable spare sectors in the present group. In this case, optical disk device 102 determines whether there are any groups for which the search for usable spare sectors has not been performed (step S805). As a result, if it finds a group which has not been searched, optical disk device 102 sets such group as the group to have its spare sectors searched (step S806), and searches the spare sectors as before (steps S802–S805). If, on the other hand, there are no groups which have not been searched, the process is terminated with an error (step S807).

The following is a detailed description of step S703 in FIG. 7, with the process for updating SDL (step S703) being different for ISO Standard and ANSI Standard. Here, FIG. 9 is a flowchart for the SDL updating process under ISO Standard while FIG. 10 is a flowchart for the SDL updating process under ANSI Standard. Note here that for either standard, the SDL entries need to be arranged so that the addresses written into the defective sector positions 403 are in rising order.

The following explanation will first deal with the SDL updating process under ISO Standard, with reference to FIG. 9. First, optical disk device 102 writes the address of the detected defective sector into defective sector position 403 of a new entry in the SDL (step S901). Next, optical disk device 102 writes the address of the found spare sector into replacement sector position 404 in the new entry (step S902) and increases the total number of entries by one (step S903). Finally, optical disk device 102 rearranges the new entry along with the existing entries so that the addresses written into defective sector positions 403 are in rising order (step S904).

The following explanation will next deal with the SDL updating process under ANSI Standard, with reference to FIG. 10. First, optical disk device 102 determines whether the detected defective sector is a sector which is already written in the SDL as a replacement sector (step S1001). If, as a result, it determines that the sector is not written in as a replacement sector, optical disk device 102 writes the address of the detected defective sector into defective sector position 403 of a new entry in the SDL (step S1002). Next, optical disk device 102 writes the address of the found spare sector into replacement sector position 404 in the new entry (step S1003).

On the other hand, if optical disk device 102 determines that the detected defective sector is already written in as a replacement sector, it writes the address of the found spare sector into replacement sector position 404 of the entry which has this defective sector as its replacement sector (step S1004). Following this, it writes the address of the defective replacement sector into defective sector position 403 of a new entry (step S1005) and writes in FFFFFFFF (in hexadecimal) as replacement sector position 404 of that entry (step S1006).

Finally, optical disk device 102 increases the total number of entries by one (step S1007) and rearranges the new entry along with the existing entries so that the addresses written into defective sector positions 403 are in rising order (step S1008).

As described above, defect management is executed by updating the entries in the SDL for both the first conventional method (chaining) and the second conventional method (direct pointer). However, for both methods it is necessary to record as many entries in the SDL as there are defective sectors, which gives the drawback that a large capacity SDL becomes necessary.

In particular, for optical disks under the phase change method, deterioration in the quality of the medium due to cyclic recording is more pronounced than under the magneto-optical method, so that it becomes necessary to provide the system with an SDL of considerable size. Here since four DMA, which each include an SDL, are provided on each disk, there is a large increase in the number of sectors used for the DMA, which restricts the area of the disk that can be used as the rewritable zone.

Also, if there is an increase in the area used for the DMA, this means there is an increase in the probability that the DMA themselves will include defective sectors, so that there is a further problem of reduced reliability for defect management.

SUMMARY OF THE INVENTION

The first object of the present invention is to provide an SDL, which is to say a defect list which stores information relating to defective sectors and to replacement sectors on an information recording medium, of reduced size.

This object can be achieved by a management method for using sector units which are units for recording and reproduction to manage a defect which arises in an information recording medium that includes predetermined recording areas made up of a data area, a spare area and a defect list, said management method comprising: a replacement sector assigning step for assigning, when a defective sector is found, a sector in the spare area which is to be used for replacing the defective sector; an area judging step for judging whether the defective sector belongs to the data area or to the spare area; a new defect entry registration step for writing, when the area judging step judges that the defective sector belongs to the data area, identification information for the defective sector paired together with identification information for a replacement sector assigned in the replacement sector assigning step into a new entry in the defect list; a defect entry overwriting step for overwriting, when the area judging step judges that the defective sector belongs to the spare area, identification information for a replacement sector assigned in the replacement sector assigning step into an entry in the defect list into which identification information for the defective sector is written, wherein no information except for identification information for sectors belonging to one of the data area and the spare area is written into the defect list.

Under the above method, only pairings of identification information of defective sectors belonging to the data sector area and identification information of non-defective sectors which belong to the spare sector area and which are to be used to replace the defective sectors are stored in the defect list. Accordingly, unlike the conventional chaining method, pairings of identification information for defective sectors belonging to the data area and identification information for defective sectors belonging to the spare area are not recorded. Similarly, unlike the conventional direct pointer method, pairings of identification information for defective sectors belonging to the spare area and information indicating that the sectors are defective sectors are not recorded. This means that a large reduction in the size of the defect list is achieved.

Accordingly, there is no reduction in the size of the rewritable zone even for information recording mediums which suffer from deterioration due to cyclic recording, with the reduction in the size of the defect list further reducing the probability of the occurrence of defective sectors in the defect list itself. This means defect management is achieved with high reliability.

Furthermore, since the number of recorded entries in the defect list is smaller than the number of defective sectors which occur in the information recording medium, it becomes possible to initialize the information recording medium so that the spare area has a number of sectors which exceeds the number of pairings in the defect list, even when deterioration in the information recording medium due to cyclic recording can be anticipated.

Here, if the rewritable zone is divided into a plurality of groups each made up of a part of the spare area and a part of the data area and if the information recording medium is provided with a spare sector lack information area, then lack information for each group which shows whether any assignable spare sectors are left in the group can be recorded and updated.

In this way, by providing the information recording medium with a spare sector lack information area which takes up very little storage space, in addition to the above effects, flexible defect management is achieved wherein for an information storage device whose rewritable zone is divided into a plurality of groups, a spare sector can be borrowed from another group when there is a lack of usable spare sectors in a present group.

It is also possible to provide the information recording medium with a next spare sector pointer area in place of the spare sector lack information area, which is an area for recording and updating not information showing whether any assignable spare sectors are left in the group but information showing the address of the next sector to be used in assignment.

In this way, by providing the information recording medium with a next spare sector pointer area which takes up little storage space, then, in addition to the above effects, rapid defect management is achieved wherein the search for a replacement sector on discovering a defective sector is especially fast.

Here, it is also possible for the defect list to store not only pairings of identification information for defective sectors in the data area and identification information for non-defective sectors which belong to the spare sector area and which are to be used to replace the defective sectors, but also information which shows that there is no assignable spare sector left in the spare area.

By doing so, the size of the defect list can be reduced over conventional methods and there is the additional advantage of favorable interchangeability with conventional defect management methods since this method does not require any special areas in the defect list which are not present under such conventional methods.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 5A shows the rewritable zone to explain the linear replacement algorithm under ISO standard for a prior art example;

FIG. 5B is a drawing showing the content of the SDL in order to explain the same linear replacement algorithm;

FIG. 21A shows the rewritable zone to explain the linear replacement algorithm used by the third embodiment of the present invention;

FIG. 21B is a drawing showing the content of the SDL in order to explain the same linear replacement algorithm;

FIG. 23A shows the rewritable zone to explain the linear replacement algorithm used by the fourth embodiment of the present invention;

FIG. 23B is a drawing showing the content of the SDL in order to explain the same linear replacement algorithm; and FIG. 24 is a flowchart for the defect list updating process for the fourth embodiment of the present invention.

DESCRIPTION OF THE PREFERRED EMBODIMENTS

The following is an explanation with reference to the drawings of the defect management method and the optical disk device realizing the method to which the present invention relates.

First Embodiment

The first embodiment relates to a defect management method which can be used when the rewritable zone is composed of only one group. (Layout of the Optical Disk)

The main differences between the optical disk of the present embodiment and conventional disks lie in the construction of the rewritable zone and the recording/updating method of the SDL, so that the following explanation will focus on these differences.

Figure 2A:
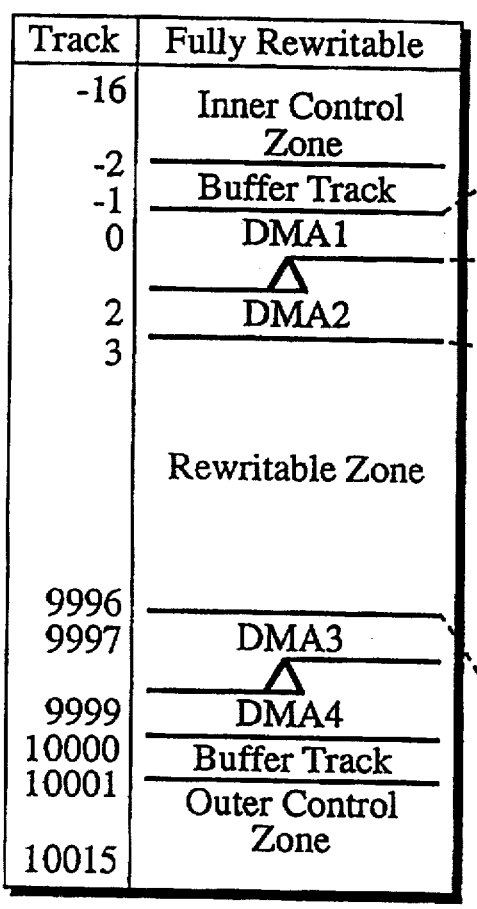
FIG. 2A is a layout figure showing the data zone of a prior art example of an optical disk.
Figure 2B:
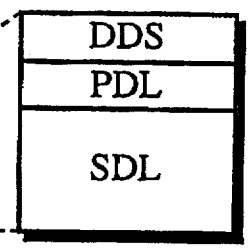
FIG. 2B is a figure showing the composition elements in each DMA shown in FIG. 2A.
Figure 2C:
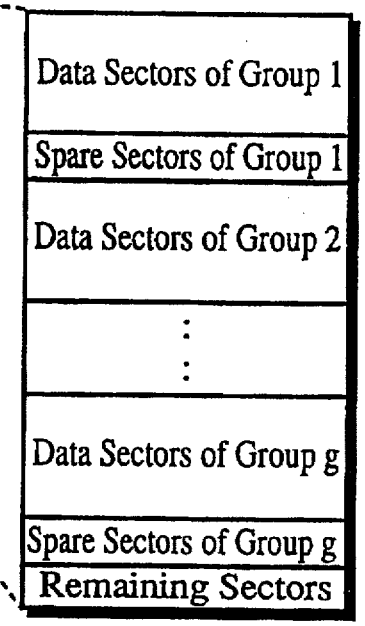
FIG. 2C is a figure showing the partitions of the rewritable zone shown in FIG. 2A.
Figure 11A:
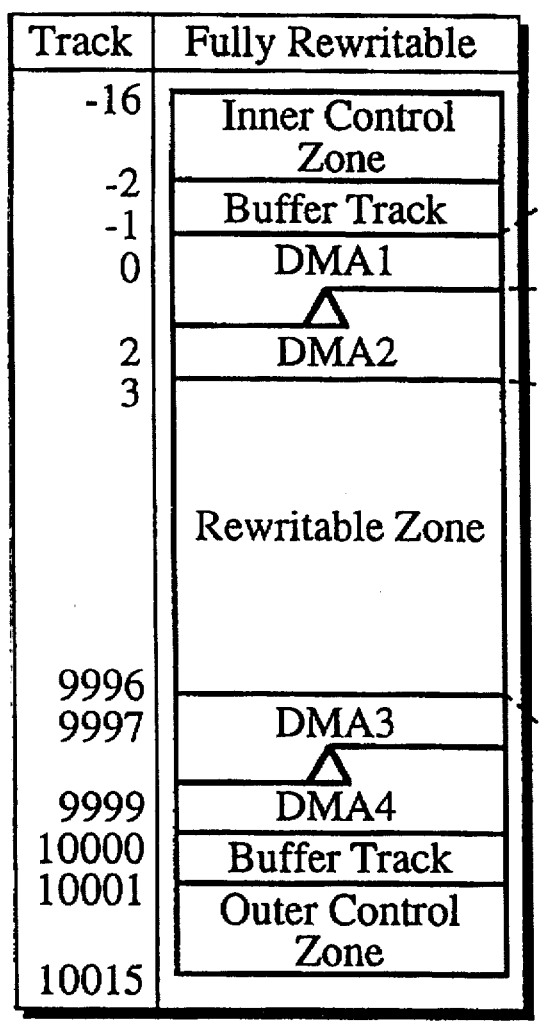
FIG. 11A is a layout figure showing the data zone of the optical disk to which the first embodiment of the present invention relates.
Figure 11B:
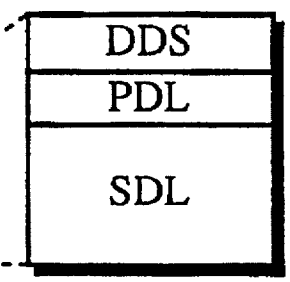
FIG. 11B shows the composition elements of each DMA shown in FIG. 11A.

FIG. 11 is a layout figure showing the data zone of the optical disk to which the first embodiment of the present invention relates and so corresponds to FIG. 2 which shows a conventional optical disk. Here, FIGS. 11A and 11B are the same as FIGS. 2A and 2B in the description of the prior art.

Figure 11C:
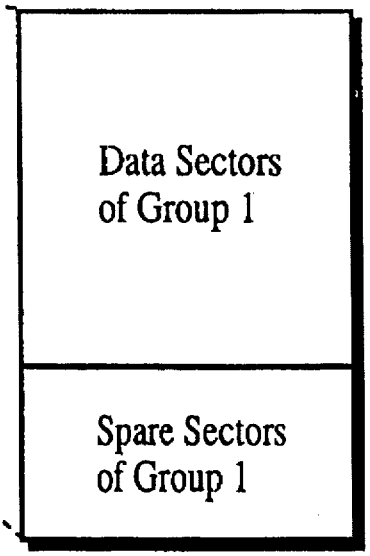
FIG. 11C is a figure showing the partitions of the rewritable zone shown in FIG. 11A.

FIG. 11C is a partition figure for the rewritable zone. In the present embodiment, the rewritable zone is made up of only one group instead of the multiple groups in the prior art example. It should be noted here that the SDL is composed in the same way as the SDL for the ISO standard shown in FIG. 4 of the prior art section. Also, the physical arrangement of tracks and sectors in the data zone of the optical disk in the present embodiment is the same as that shown in FIG. 3 of the prior art section.

As can be seen from FIG. 11A, each area provided for use as a DMA is made up of 1.5 tracks. Here, each track is made up of 25 sectors, so that each DMA is made up of 37 sectors. When DDS and PDL are each set as one sector, the maximum capacity of an SDL can be seen to equal 35 sectors. The storage capacity of each sector is 512 bytes, with the header of the SDL being composed of 16 bytes and each entry in the SDL being composed of 8 bytes, so that the maximum number of entries in the SDL is 2,238 entries. It should be noted here that although the total number of spare sectors is limited to 1,024 or below under the ISO Standard, a total of up to 2,238 spare sectors becomes possible just by limiting the area used for DMA.

In the present embodiment, the area of spare sectors shown in FIG. 11C is assigned a number of sectors which exceeds 2,238, since deterioration in the quality of the disk due to cyclic recording can be foreseen. This figure is written into DDS when the information storage medium is initialized. Putting this in other words, for the assignment of spare sectors in the present invention, a number of spare sectors which is larger than the maximum number of entries in the SDL is recorded in DDS.

Figure 12A:
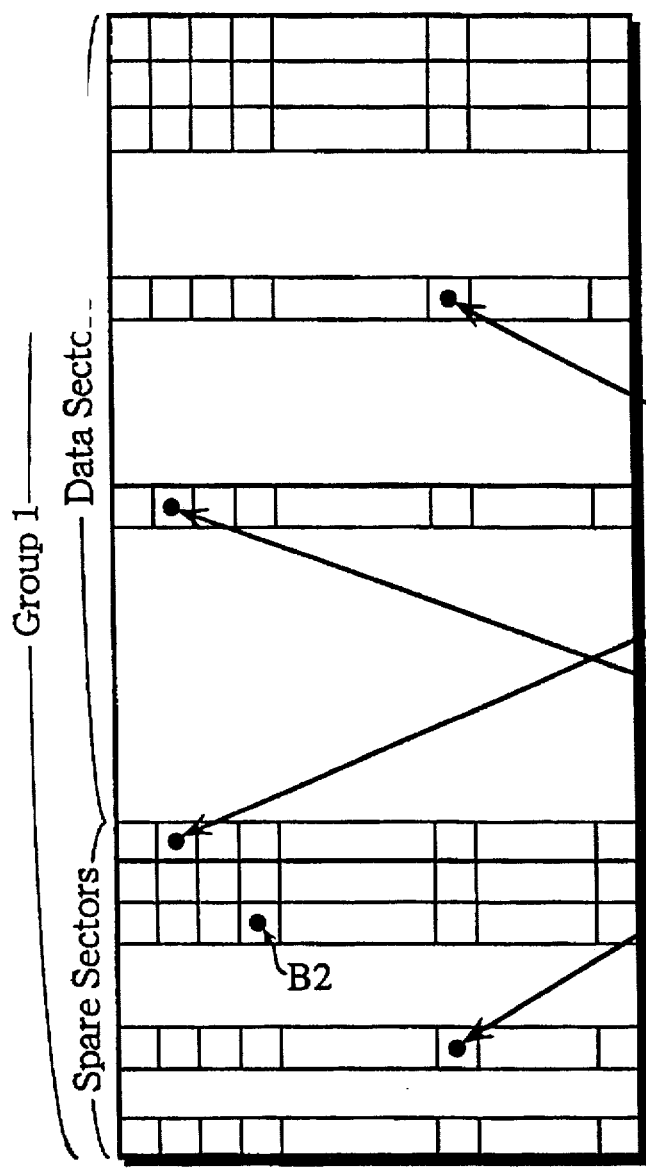
FIG. 12A shows the rewritable zone to explain the linear replacement algorithm for the first embodiment of the present invention.
Figure 12B:
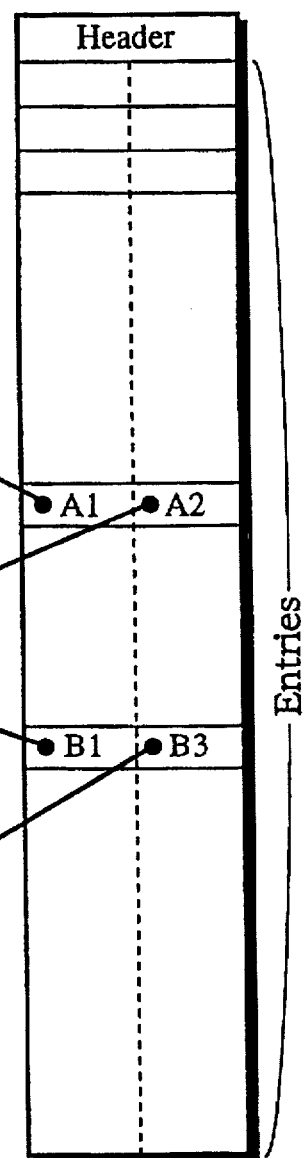
FIG. 12B is a drawing showing the content of the SDL in order to explain the same linear replacement algorithm.

FIGS. 12A and 12B are conception figures of the linear replacement algorithm used by the present embodiment.

FIG. 12A is a layout figure for the rewritable zone, with this rewritable zone being made up of only one group which is in turn made up of a plurality of data sectors and a plurality of spare sectors.

Figure 6A:
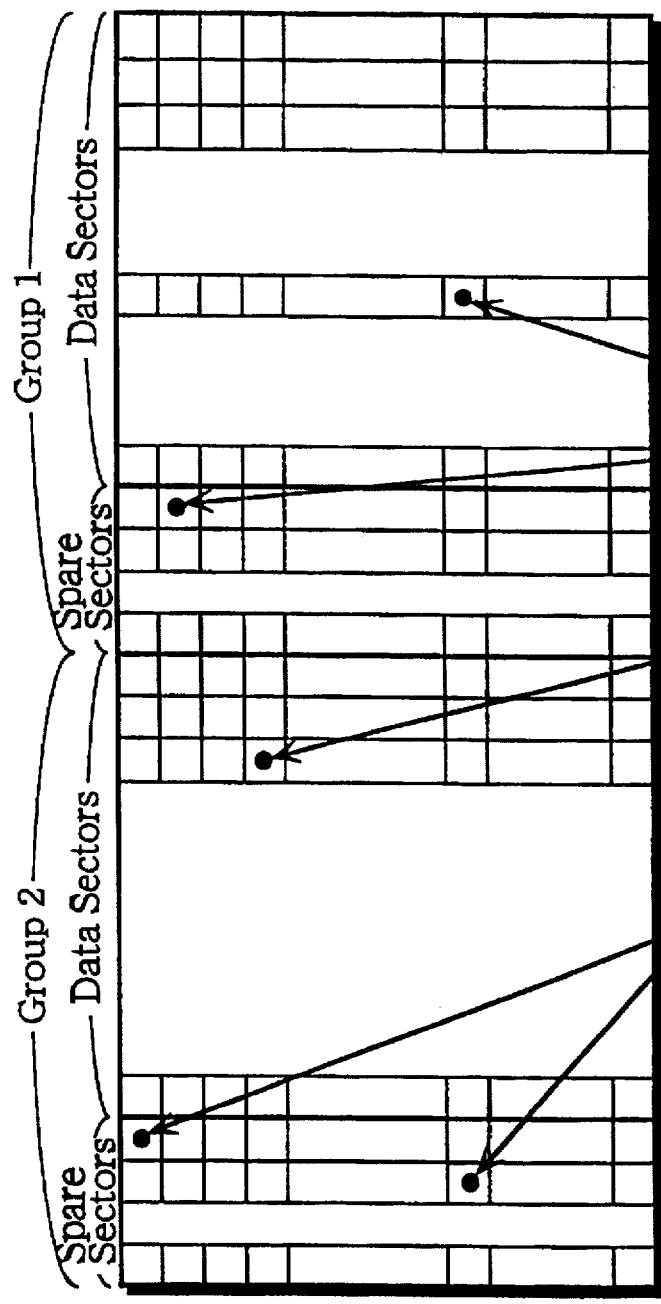
FIG. 6A shows the rewritable zone to explain the linear replacement algorithm under ANSI standard for a prior art example.
Figure 6B:
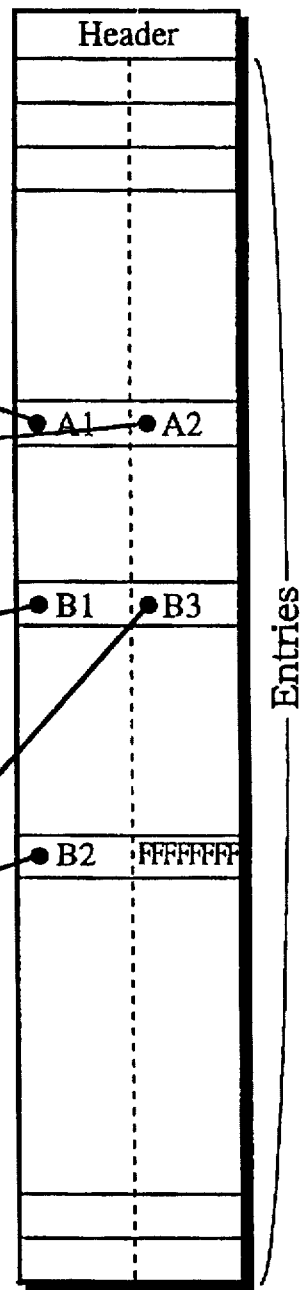
FIG. 6B is a drawing showing the content of the SDL in order to explain the same linear replacement algorithm.

Here, the defects present on the surface of the optical disk are presumed to occur in the same way as in the prior art section. This is to say, sector A1, sector A2, sector B1, sector B2 and sector B3 are the positions shown in figure, with sector A1, sector B1, and sector B2 being the defective sectors. The content of the SDL for this state is shown in FIG. 12B. As can be seen from FIG. 12B, this SDL includes information showing the replacement of sector A1 with sector A2 and information showing the replacement of sector B1 with sector B3. Information showing the replacement of defective replacement sector B2 with sector B3 is not included. This is because although sector B2 was originally used to replace sector B1, the information relating to sector B2 was erased from the SDL when sector B2 itself became a defective sector due to deterioration of the disk. As can be seen by comparing FIG. 12B in the present embodiment with FIGS. 5B and 6B in the prior art section, this means the management of defects which required three entries in a prior art table can be achieved in the present embodiment with only two entries.

If the host computer requests access to sector B1, the optical disk device is set so as refer to the content of the SDL and then access sector B3 in place of sector B1 in accordance with the stored content of the SDL. Accordingly, it can be seen that the optical disk method is able to execute defect management even without information relating to the defective replacement sector B2.

(Construction of the Optical Disk Device)

Figure 1:
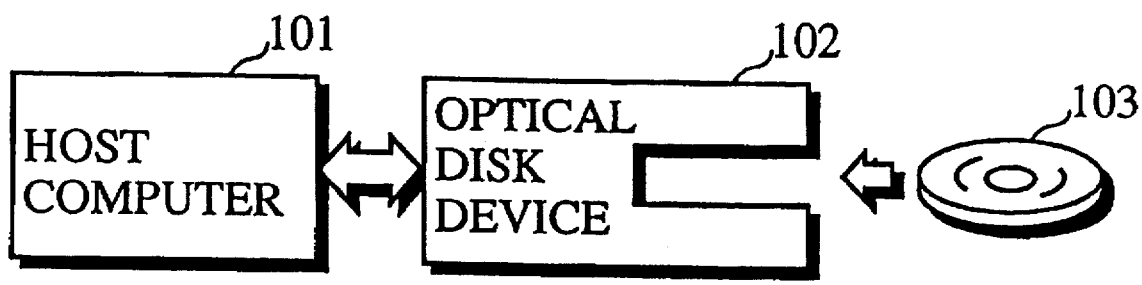
FIG. 1 is a figure showing the construction of a conventional computer system which using an optical disk.
Figure 13:
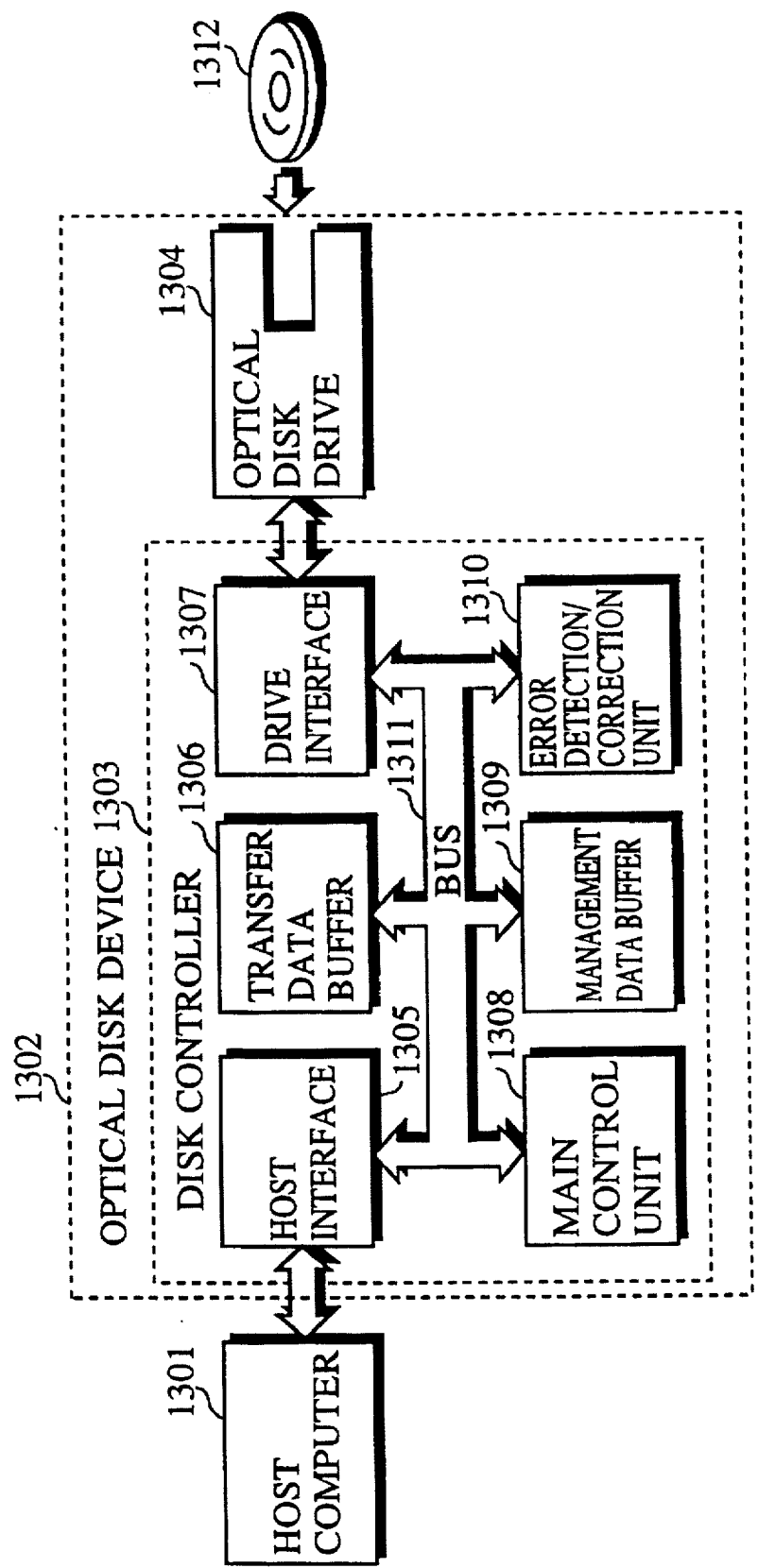
FIG. 13 is a block diagram showing the construction of the optical disk device to which the first embodiment of the present invention relates.

FIG. 13 is a block diagram showing the construction of optical disk device 1302 to which the first embodiment of the present invention relates. This figure, in the same way as FIG. 1, shows host computer 1301 and optical disk 1312 in addition to optical disk device 1302.

Optical disk device 1302 can be seen to be made up of a construction which can be broadly classified into optical disk drive 1304 and disk controller 1303.

Optical disk drive 1304 is made up of a mechanical part which rotates the installed optical disk 1312 and an optical head and signal processing part which execute data recording and reproduction.

Disk controller 1303 is made up of host interface 1305, transfer data buffer 1306, drive interface 1307, main control unit 1308, management data buffer 1309, error detection/correction unit 1310 and bus 1311.

Host interface 1305 is connected to host computer 1301 and receives access requests for a specified sector on optical disk 1312 installed into optical disk drive 1304, as well as supplying and receiving transfer data.

Drive interface 1307 is connected to optical disk drive 1304 and supplies and receives transfer data and drive commands.

Transfer data buffer 1306 is a RAM for temporarily storing the transfer data which is used to make up for the difference between the recording/reproduction speed of optical disk drive 1304 and the data transfer speed to host computer 1301.

Error detection/correction unit 1310 uses the retrieved data and the error correction codes to perform error detection and correction, as well as executing the detection of whether an access sector is a defective sector which exceeds the error capacity given by the error correction code.

Management data buffer 1309 is made up of RAM and includes an area which temporarily stores a copy of the four DMA from optical disk 1312.

Main control unit 1308 is made up of a CPU, ROM and RAM and executes the entire control process of disk controller 1303 via bus 1311 in accordance with a stored control program.

Also, main control unit 1308 stores the DMA read from optical disk 1312 in management data buffer 1309, updates the contents of management data buffer 1309 on receiving notification from error detection/correction unit 1310 of the detection of a defective sector and writes this updated content back into the DMA on optical disk 1312 at an appropriate time. By executing these processes, main control unit 1308 executes the defect management of the installed optical disk 1312.

(Operation of the Optical Disk Device)

The following is an explanation of the operation for the defect management by the optical disk device constructed as described above. As mentioned above, since this defect management is achieved based on instructions issued by main control unit 1308 by finally having the DMA, and in particular the SDL in the DMA, updated on the installed optical disk 1312, the following explanation will especially focus on this updating procedure.

Figure 7:
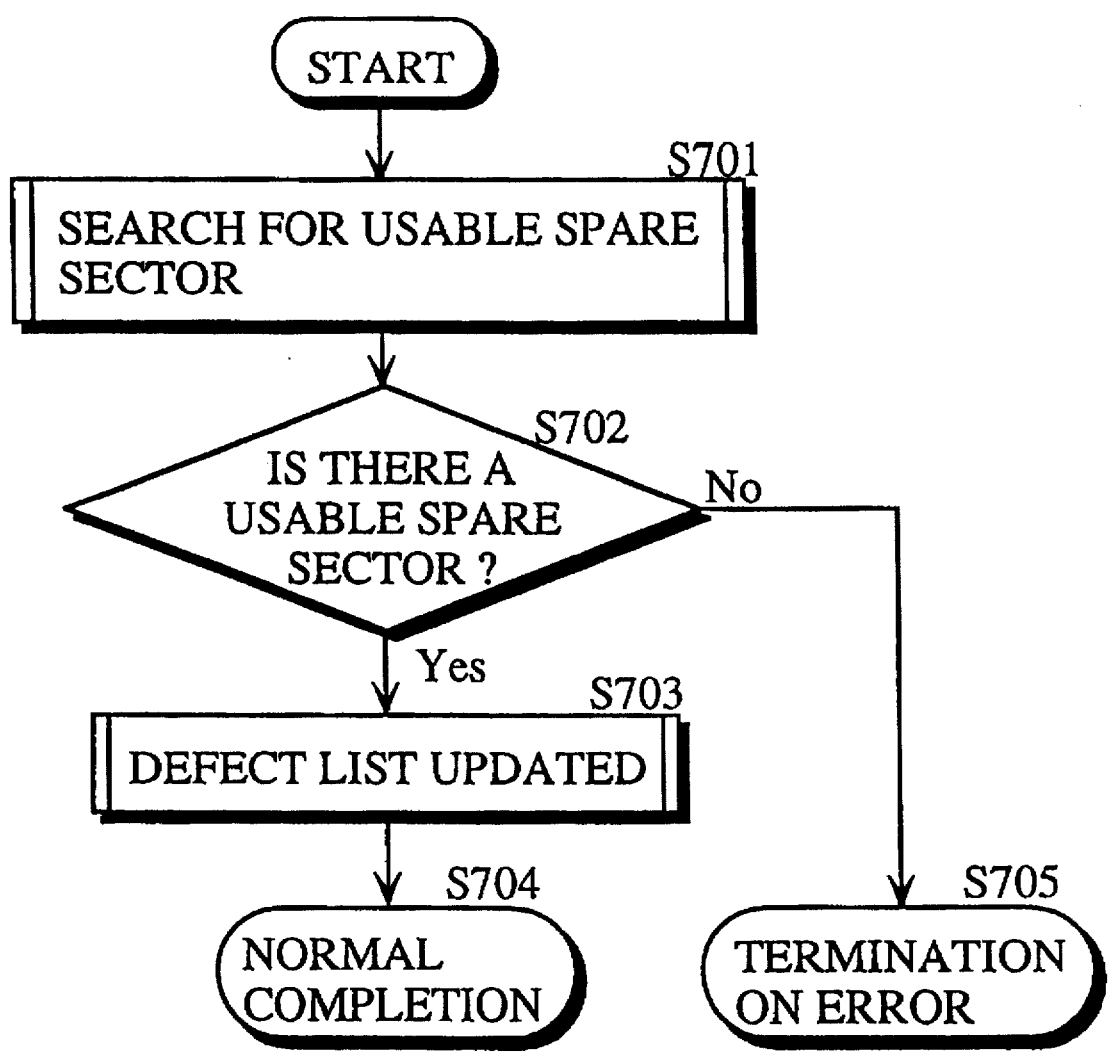
FIG. 7 is a flowchart for the process assigning replacement sectors for a prior art example.
Figure 14:
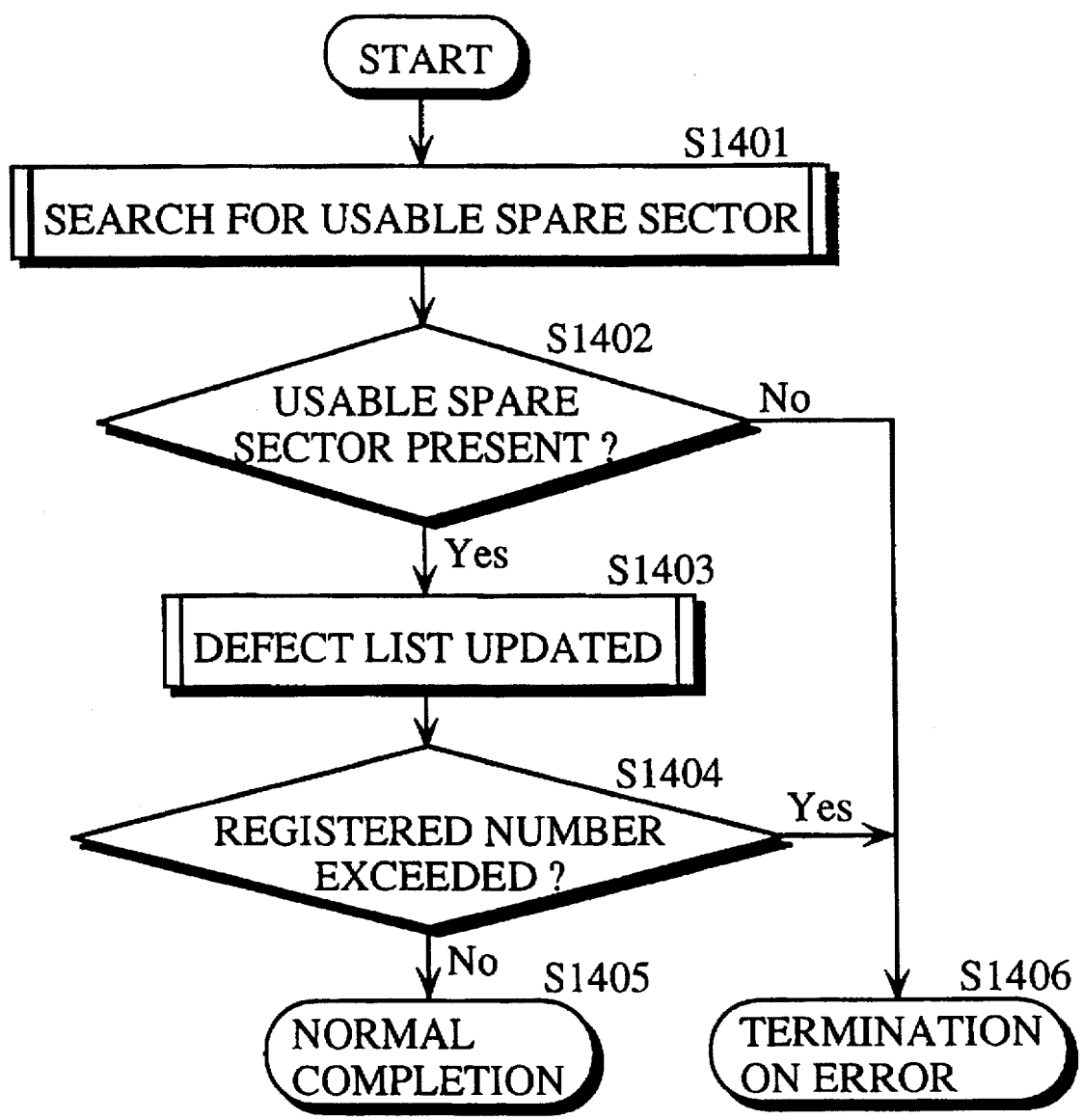
FIG. 14 is a flowchart for the process assigning replacement sectors under the first embodiment of the present invention.

FIG. 14 is a flowchart showing the process for assigning a replacement sector performed by optical disk device 1302 when the sector on optical disk 1312 to be accessed by host computer 1301 is a defective sector, with this flowchart corresponding to the flowchart shown in FIG. 7 of the prior art section.

First, optical disk device 1302 searches for a usable spare sector on optical disk 1312 (step S1401). If, as a search result, there is no usable spare sector, the process is terminated with an error (step S1402, S705).

On the other hand, if there is a usable spare sector, the SDL is updated (step S1403, S703) and it is determined whether the number of entries exceeds the registered number (step S1404). If, as a determination result, the number of entries exceeds the registered number, the process is terminated with an error (step S1406), otherwise the process is completed as normal (step S1405).

The difference here with the prior art lies in the checking of whether the number of entries exceeds the registered number in step S1404. This is executed in the present embodiment since the number of spare sectors assigned to the rewritable zone is larger than the maximum number of entries which can be recorded in the SDL.

Figure 15:
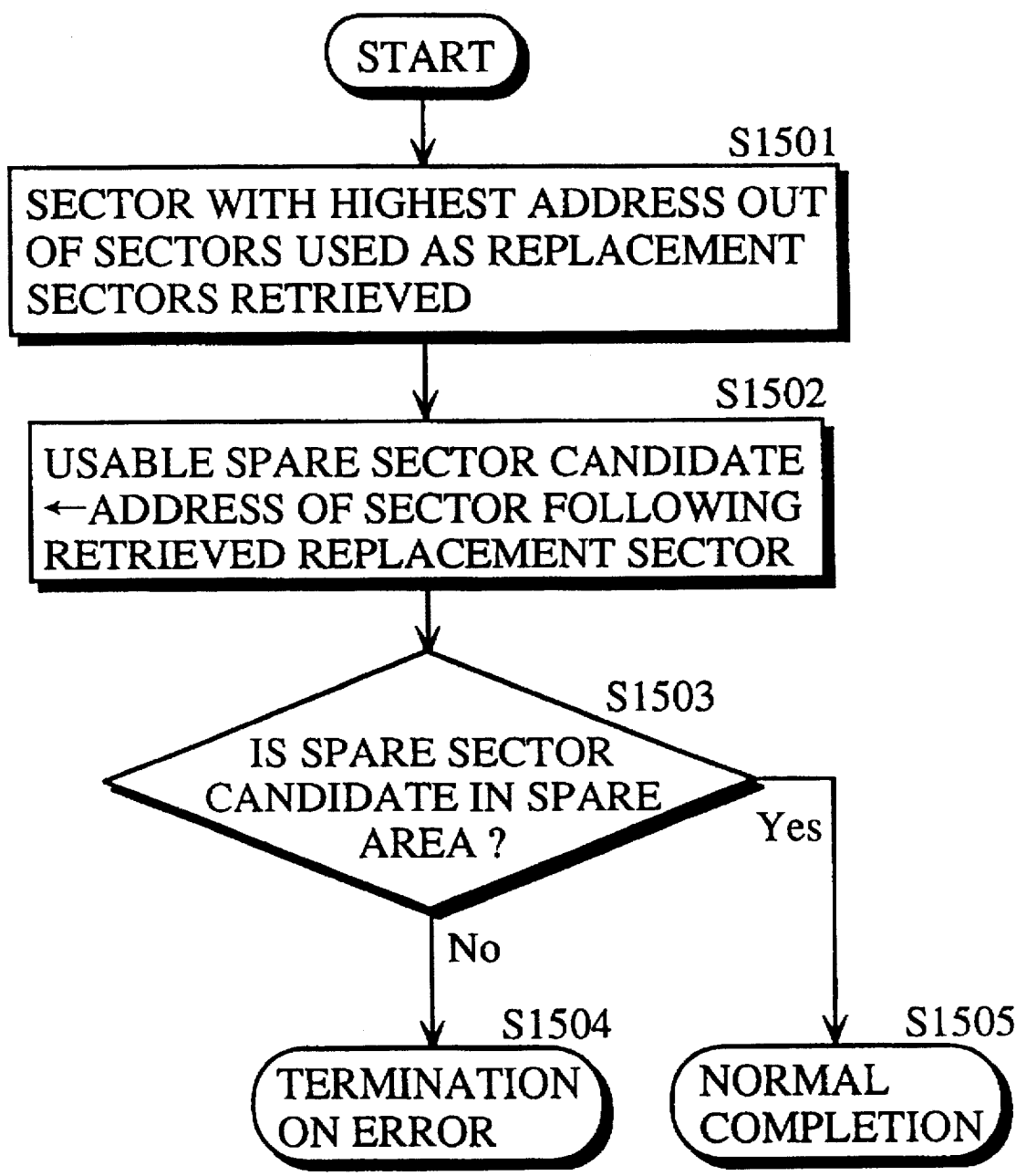
FIG. 15 is a flowchart showing the search process for a usable spare sector under the first embodiment of the present invention.

FIG. 15 is a flowchart which shows the processing executed in the search for a usable spare sector and will be used to explain the details of the processing executed in step S1401. It should be noted here that in the same way as the ISO Standard, the order in which spare sectors are used as replacement sector is a rising order based on the sector addresses. In this embodiment, however, there is only one group.

First, a spare sector with a highest address, out of the spare sectors which have already been used as replacement sectors, is retrieved from SDL by optical disk device 1302 (step S1501). Next, a spare sector which has a next address after the retrieved sector is set as a usable spare sector candidate (step S1502). After this, it is determined whether the sector set as a candidate is a sector in the spare area (step S1503), with the process being completed as normal when it is in the spare area (step S1504). When the sector is not in the spare area, the process is terminated with an error (step S1505).

It should be noted here that since there is only one group in the present embodiment, a spare sector cannot be borrowed from another group. Accordingly, when a replacement sector becomes defective, it is erased from the SDl and a spare sector at a higher address than this defective replacement sector is recorded in the SDL as a replacement sector. Since spare sectors are used as replacement sectors in a rising order of addresses, then, of the spare sectors already used as replacement sectors, the sector with the highest address will definitely be registered in the SDL.

Figure 16:
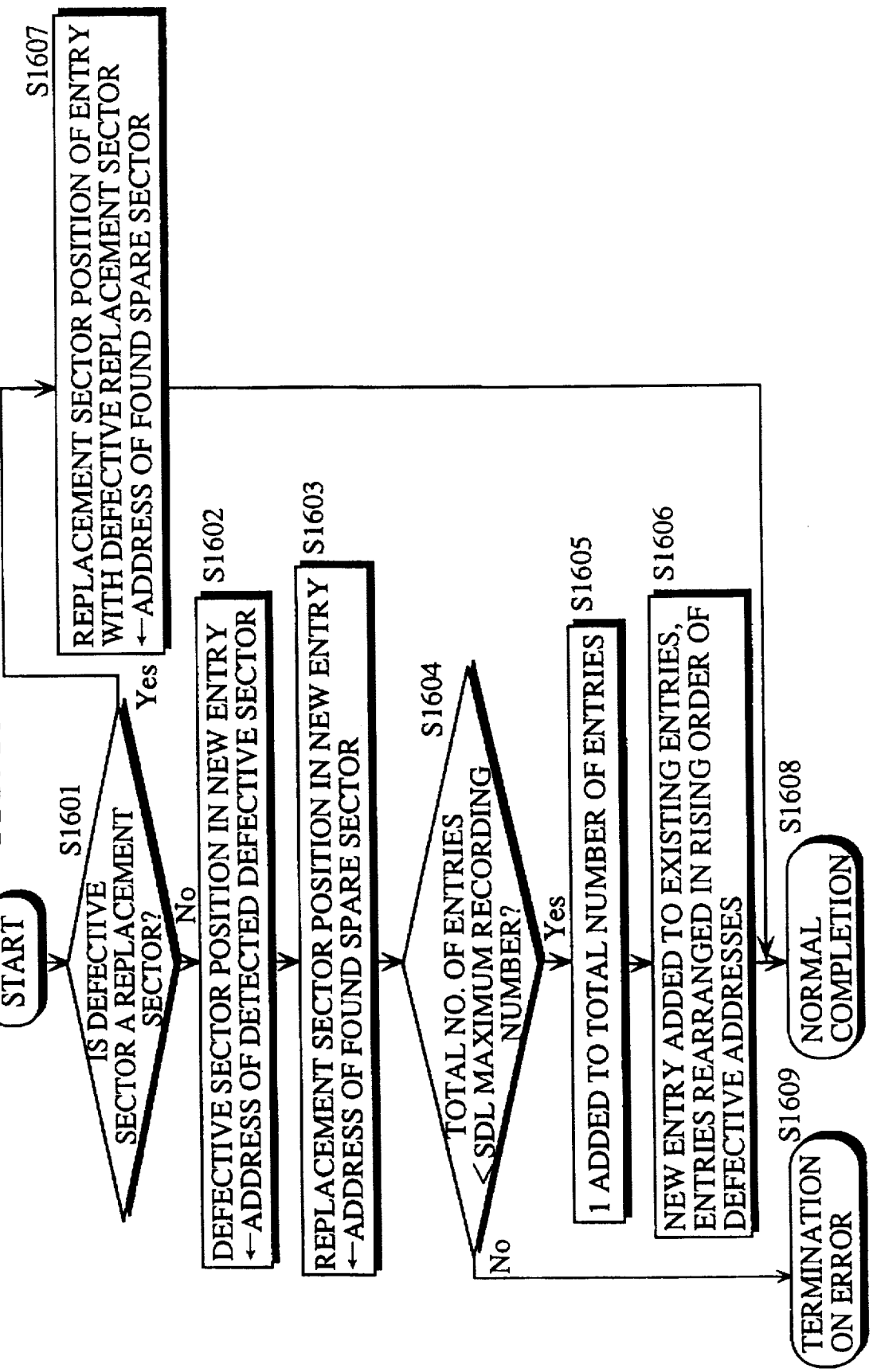
FIG. 16 is a flowchart for the defect list updating process for the first embodiment of the present invention.

FIG. 16 is a flowchart showing the updating process for the SDL and will be used to explain the details of the processing in step S1403 in FIG. 14.

First, optical disk device 1302 determines whether the detected defective sector is a sector which is already written in the SDL as a replacement sector (step S1601). If, as a result, optical disk device 1302 determines that the detected defective sector is already written in as a replacement sector, it writes the address of the spare sector found in step S1401 into replacement sector position of the entry which has this defective sector as its replacement sector (step S1607). On the other hand, if it determines in step S1601 that the sector is not written in as a replacement sector, optical disk device 1302 writes the address of the detected defective sector into defective sector position of a new entry in the SDL (step S1602). Next, optical disk device 102 writes the address of the spare sector found in step S1401 into replacement sector position 404 in the new entry (step S1603).

Next, optical disk device 1302 determines whether the pre-recorded total number of entries is below the maximum number which can be recorded in the SDL (step S1604), with the process ending with an error if the number of entries has reached the maximum number (step S1609).

On the other hand, if the total number of entries is below the maximum number, optical disk device 1302 increases the total number of entries by one (step S1605) and rearranges the new entry along with the existing entries so that the addresses written into defective sector positions are in rising order (step S1606).

As described above, the first embodiment of the present invention differs from the prior art in that there is no unnecessary use of disk space due to the SDL storing defective spare sectors (such as sector B2 in FIG. 12), so that the same pattern of defects can be described by an SDL of smaller size than the prior art.

Furthermore, since provisions are made for the deterioration of the information storage medium due to cyclic recording, the information storage medium can be initialized so that more spare sectors are provided than the maximum number of entries which can be recorded in the SDL.

Second Embodiment

The following is an explanation of the second embodiment with reference to the drawings.

The present embodiment relates to a defect management method which is adapted to a rewritable zone composed of a plurality of groups and has a feature whereby information relating to the spare sectors in each group is incorporated into the SDL.

Figure 3:
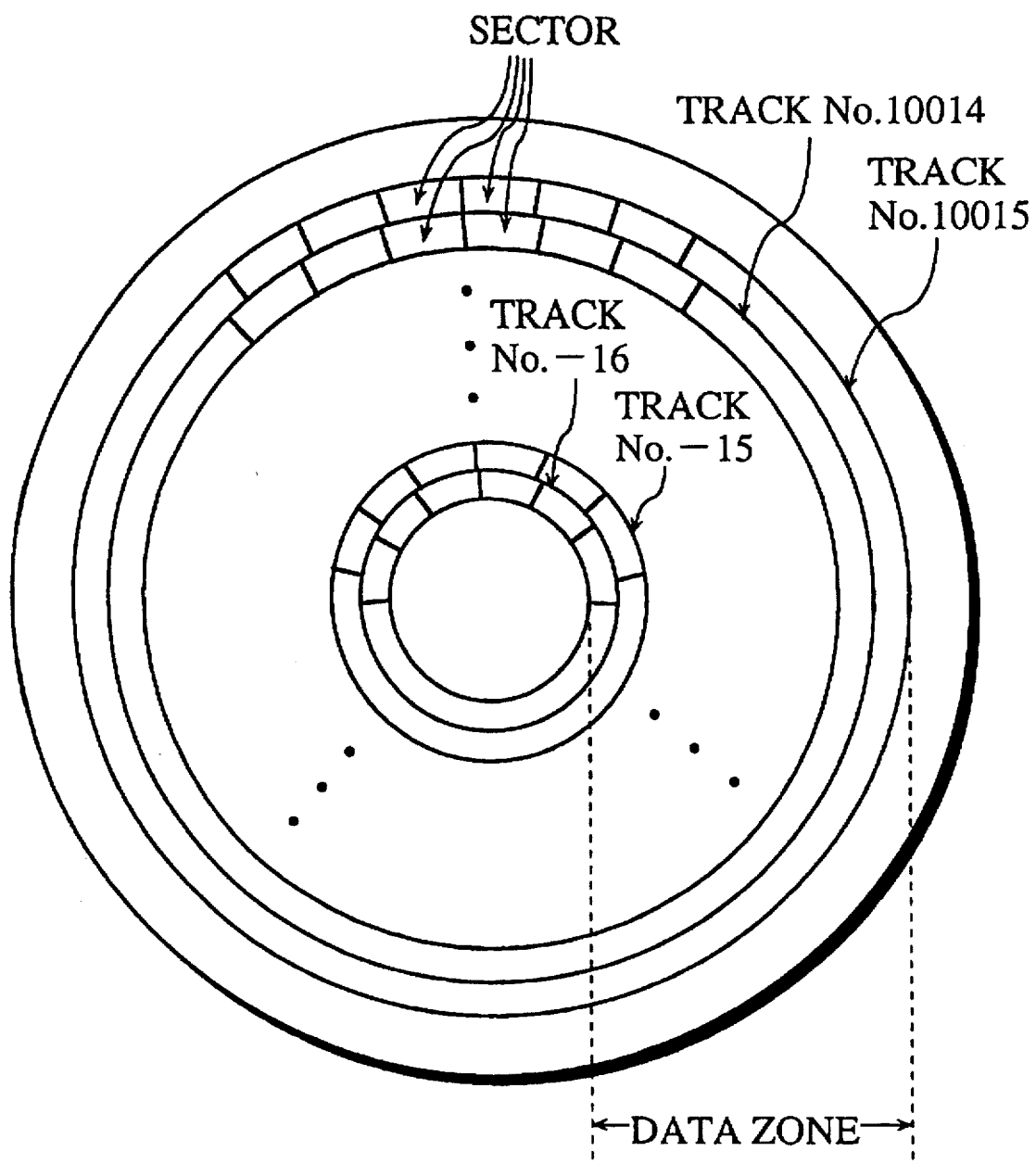
FIG. 3 is a figure showing a physical arrangement of tracks and sectors in the data zone of an optical disk.

The layout of the data zone of the optical disk to which the present embodiment relates is the same as the prior art shown in FIG. 2, with the rewritable zone being divided into a plurality of groups. Also, the physical arrangement of tracks and sectors in the data zone of the optical disk in the present embodiment is the same as shown in FIG. 3 of the prior art section.

Figure 17:
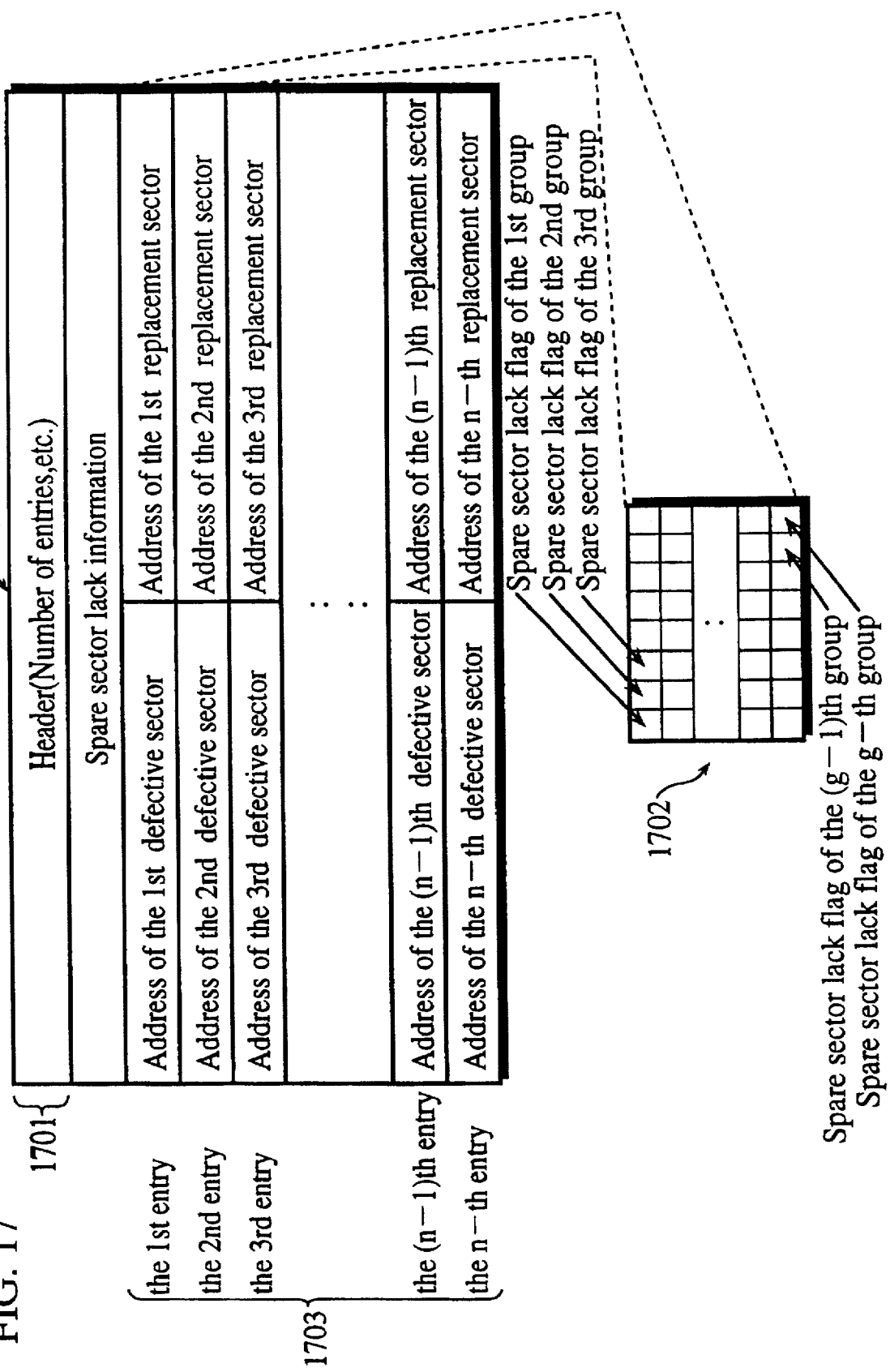
FIG. 17 is a drawing showing the composition of an SDL in the second embodiment.

FIG. 17 shows the construction of the SDL in the second embodiment. As can be seen in FIG. 17, SDL 1700 is made up of header 1701, spare sector lack information 1702 and a plurality of entries 1703. Header 1701 is made up of a descriptor showing that the data is SDL data and information such as the number of entries in the SDL.

Spare sector lack information 1702 is a group of 1-bit flags which show whether there are any usable spare sectors in the respective groups, with the same number of flags as groups being provided. In the present embodiment, the rewritable zone is made up of 32 groups, so that spare sector lack information 1702 is an area of 32 bits (=4 bytes).

Figures 18A, 18B:
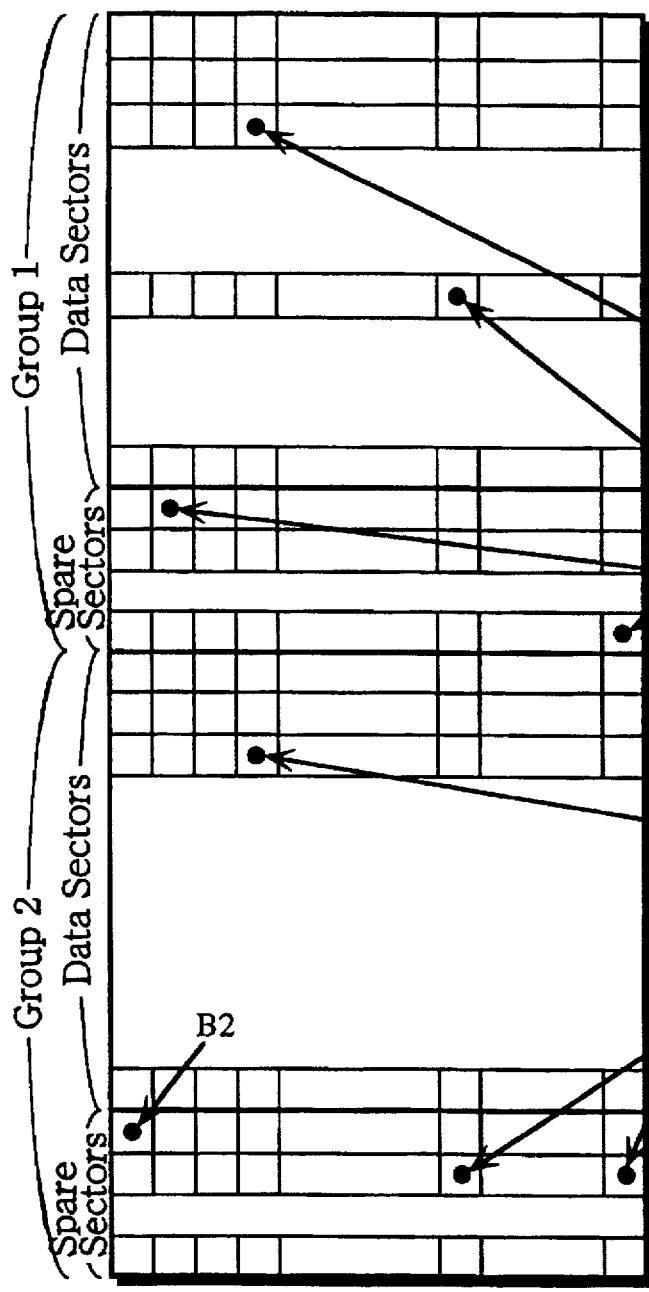
FIG. 18A shows the rewritable zone to explain the linear replacement algorithm used by the second embodiment of the present invention.
FIG. 18B is a drawing showing the content of the SDL in order to explain the same linear replacement algorithm.

FIGS. 18A and 18B are conception figures of the linear replacement algorithm used by the second embodiment of the present invention. Here, FIG. 18A is a layout figure for one part of the rewritable zone which only shows two groups out of the rewritable zone, each of these groups being made up of a plurality of data sectors and a plurality of spare sectors. In the figure, the positions of sector A1, sector A2, sector B1, sector B2, sector B3, sector C1, sector C2 and sector C3 are shown. Of these, sector A1, sector B1, sector B2, sector C1 and sector C2 are defective sectors.

FIG. 18B shows the content of the SDL. As can be seen from FIG. 18B, information showing that the usable spare sectors have been exhausted in group 1, information showing that the usable spare sectors have not been exhausted in group 2, information showing the replacement of sector A1 with sector A2, information showing the replacement of sector B1 with sector B3 and information showing the replacement of sector C1 with sector C3 is registered.

However, information showing that sector B2 and sector C2 are replacement sectors which have become defective is not registered in SDL 1700. This is because although sector B2 was originally registered as a replacement sector for sector B1, the information relating the sector B2 was erased from SDL 1700 when sector B2 became defective. In the same way, although sector C2 was originally registered as a replacement sector for sector C1, the information relating the sector C2 was erased from SDL 1700 when sector C2 became defective. This is to say, whereas the registration of a same number of entries as defective sectors (five) was necessary under the prior art, the present embodiment can execute the same defect management using only three entries in SDL 1700.

If the host computer requests access to sector B1, the optical disk device is set so as refer to the content of SDL 1700 and then access sector B3 in place of sector B1 in accordance with the stored content of SDL 1700. In the same way, if the host computer requests access to sector C1, the optical disk device is set so as refer to the content of SDL 1700 and then access sector C3 in place of sector C1 in accordance with the stored content of SDL 1700. Accordingly, it can be seen that the optical disk device is able to execute defect management even without information relating to replacement sectors B2 and C2 which became defective.

The following is an explanation of the reason for providing SDL 1700 with spare sector lack information 1702.

In group 1, C2 is the spare sector, out of the spare sectors which have been used as a replacement sector, which has the highest address in group 1, with this having been erased from the SDL 1700 as shown in FIG. 18B. Here, if SDL 1700 is not provided with spare sector lack information 1702, then there will be the misfortune that C2 will be judged as being a usable spare sector. This is to say, if the SDL is only made up of a header and entries as in the first embodiment, it becomes no longer possible to borrow usable spare sectors from other groups when there is a lack of usable spare sectors in a given group.

Accordingly, by providing SDL 1700 with spare sector lack information 1702, then even if the rewriting zone is divided into a plurality of groups, usable spare sectors can be borrowed from other groups and used as replacement sectors when there is a lack of usable spare sectors in a given group.

(Operation of the Optical Disk Device)

The following is an explanation of the processing of the optical disk device for the assignment of a replacement sector when the sector on the optical disk to be accessed by the host computer is a defective sector. It should be noted here that the construction of the optical disk device in the present embodiment is the same as that in the first embodiment. However, the control program installed in the main control unit 1308 is different to that in the first embodiment so that the replacement method executed by the main control unit 1308 is different to the first embodiment.

The flowchart for the assignment of the replacement sector is the same as that in shown in FIG. 14 for the first embodiment, except for the differences in the details of the process shown as step S1401 in FIG. 14.

Figure 19:
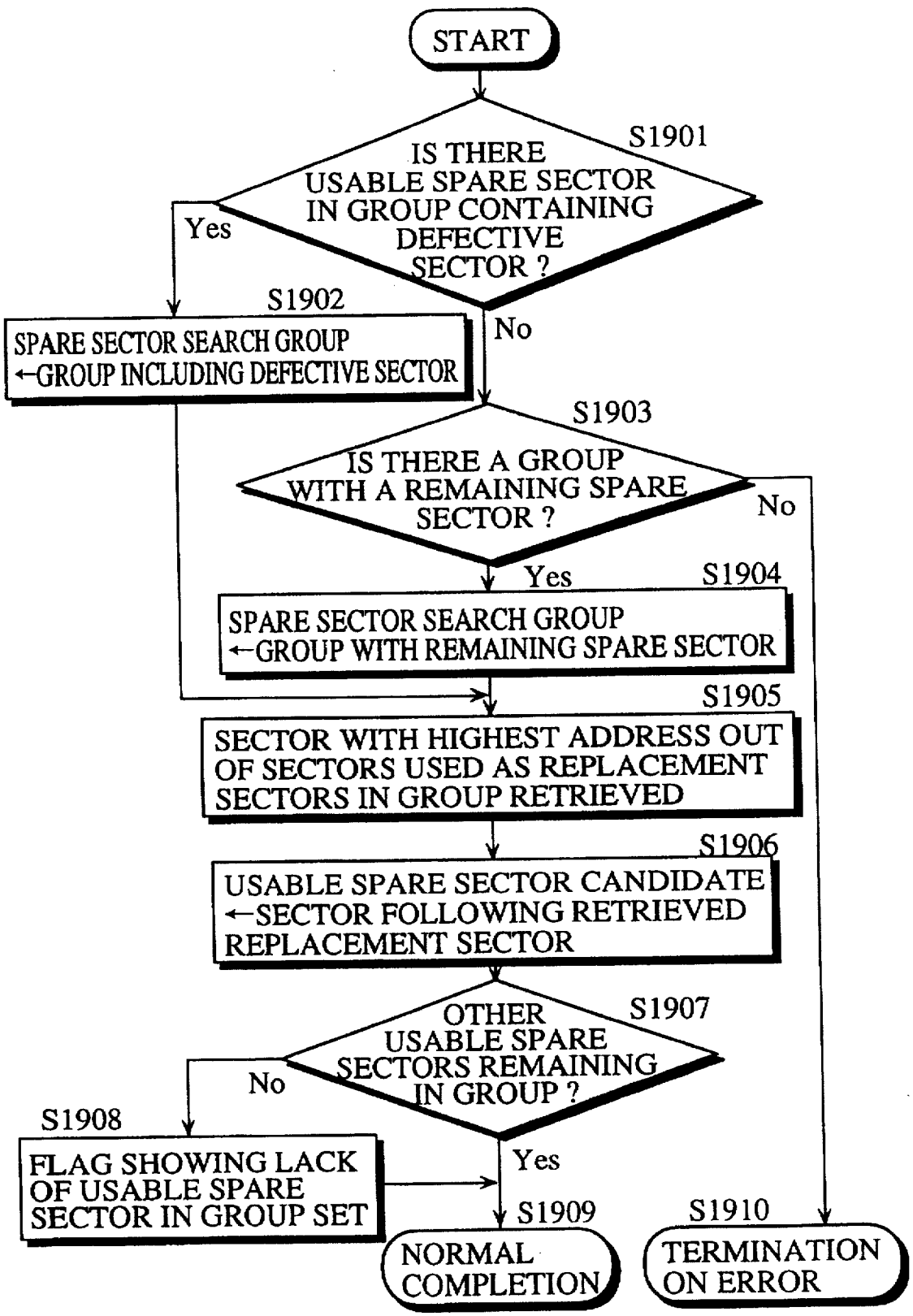
FIG. 19 is a flowchart showing the search process for a usable spare sector under the second embodiment of the present invention.

FIG. 19 is a flowchart which shows the processing executed in the search for a usable spare sector and will be used to explain the details of the processing executed in step S1401 in the second embodiment of the present invention. It should be noted here that in the same way as the ISO Standard, the order in which spare sectors are used as replacement sector is a rising order based on sector addresses.

First, optical disk device 1302 refers to spare sector lack information 1702 and determines whether there is a usable spare sector in the group to which the defective sector belongs (step S1901). If it determines that there is a usable spare sector, the present group is set as the group to have its spare sectors searched (step S1902).

On the other hand, if it determines that there is no usable spare sector, it determines whether there is another group which has a usable spare sector (step S1903), with the process ending with an error if there is no such group (step S1910).

If there is a group with a usable spare sector, the group in question is set as the group to have its spare sectors searched (step S1904).

Next, a spare sector with a highest address, out of the spare sectors which have already been used as replacement sectors in the chosen group, is retrieved from SDL by optical disk device 1302 (step S1905). Next, a spare sector which has a next address after the retrieved sector is set as a usable spare sector candidate (step S1906).

After this, it is determined whether the spare sector candidate is the spare sector with the highest address in the chosen group, which is to say whether any other usable spare sectors are remaining in the present group (step S1907).

If as a result, another usable spare sector is remaining in the chosen group, the process is completed as normal (step S1909), while if this is not the case, a flag showing a lack of usable spare sectors in that group is first written into spare sector lack information 1702 (step S1908) before the process is completed as normal (step S1909).

By means of the above process, a defective sectors can be replaced using a spare sector belonging to any other group and so not just a spare sector from a same group. It should be noted here that the details of the processing shown in the SDL updating process in FIG. 14 (step S1403) are the same as those in the first embodiment.

As described above, the second embodiment, in addition to the advantages of the first embodiment, has the ability to perform flexible defect management wherein for an information storage device whose rewritable zone is divided into a plurality of groups, in assigning a replacement sector for a defective sector, a spare sector can be borrowed from another group when there is a lack of usable spare sectors in a present group.

Third Embodiment

The following is an explanation of the third embodiment of the present invention with reference to the drawings.

The present embodiment relates to a defect management method which is adapted to a rewritable zone composed of a plurality of groups and, in the same way as the second embodiment, has a feature whereby information relating to the spare sectors in each group is incorporated into the SDL. The differences with the second embodiment lie in the content of the information and in the storage capacity.

The layout of the data zone of the optical disk to which the present embodiment relates is the same as the prior art shown in FIG. 2, with the rewritable zone being divided into a plurality of groups. Also, the physical arrangement of tracks and sectors in the data zone of the optical disk in the present embodiment is the same as shown in FIG. 3 of the prior art section.

Figure 20:
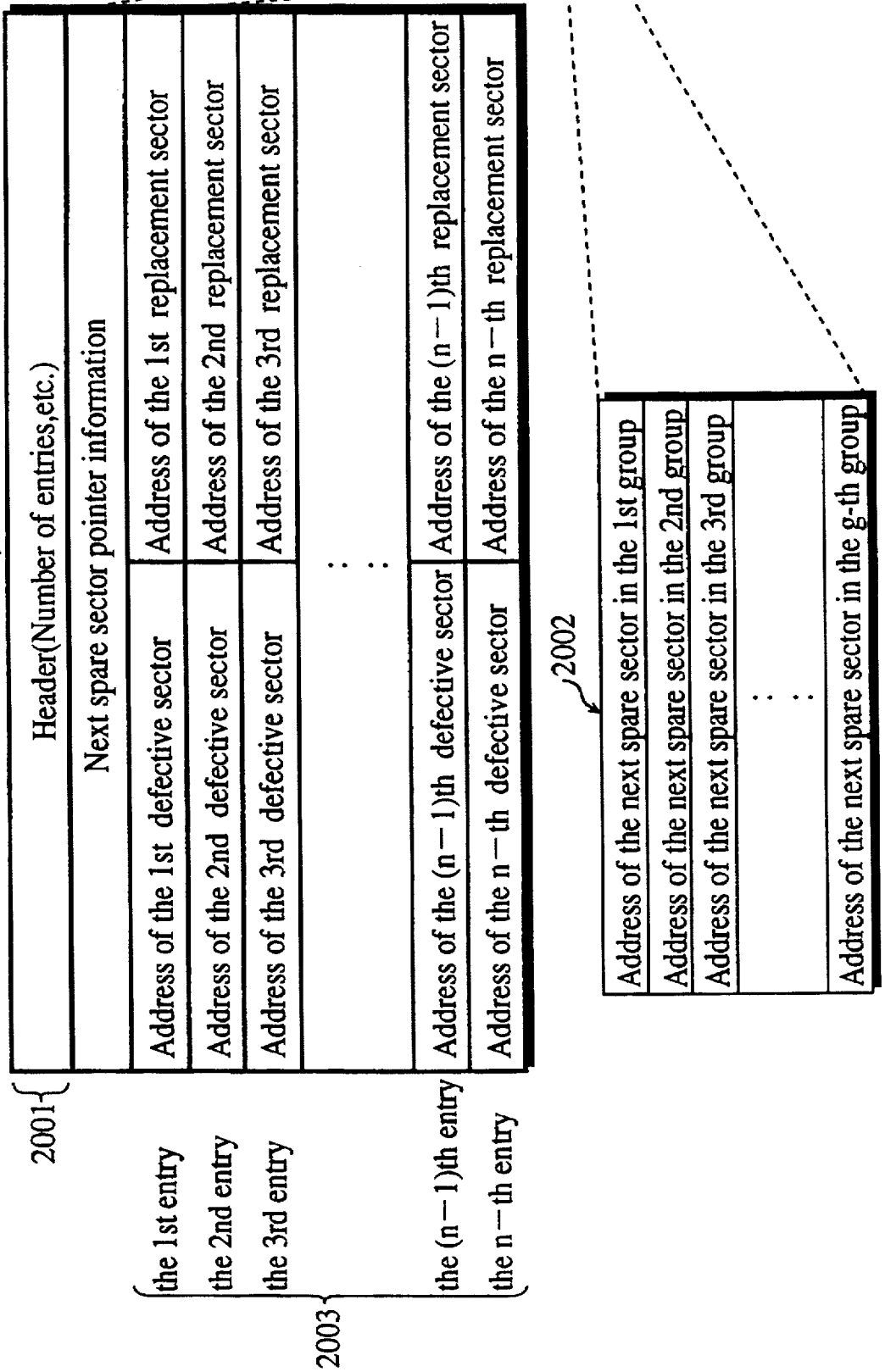
FIG. 20 is a drawing showing the composition of an SDL in the third embodiment.

FIG. 20 shows the construction of the SDL in the third embodiment. As can be seen in FIG. 20, SDL 2000 is made up of header 2001, next spare sector pointer information 2002 and a plurality of entries 2003. Header 2001 is made up of a descriptor showing that the data is SDL data and information such as the number of entries in SDL 2000.

Next spare sector pointer information 2002 stores the position of the next spare sector which can be used in each group. In the present embodiment, the sector position is expressed using four bytes and the rewritable zone is divided into 32 groups, so that next spare sector pointer information 2002 is made up of a 128-byte area.

Each entry 2003 is made up of information for a defective sector position and the position of a spare sector for replacing the defective sector.

FIGS. 21A and 21B are conception figures for the linear replacement algorithm in the third embodiment of the present invention, with FIG. 21A being a layout figure showing a part of the rewritable zone. This figure is the same as FIG. 18A in the second embodiment and so that the same defective sectors are present as before.

FIG. 21B shows the content of SDL 2000. As can be seen from FIG. 21B, information showing that the usable spare sectors are lacking in group 1 (expressed by FFFFFFFF in hexadecimal), information showing that the next usable spare sector in group 2 is sector C3, information showing the replacement of sector A1 with sector A2, information showing the replacement of sector B1 with sector B3 and information showing the replacement of sector C1 with sector C3 is registered.

However, in the same way as in the second embodiment, information showing that sector B2 and sector C2 are replacement sectors which have become defective is not registered in SDL 2000. This is because although sector B2 was originally registered as a replacement sector for sector B1, the information relating the sector B2 was erased from SDL 2000 when sector B2 became defective. In the same way, although sector C2 was originally registered as a replacement sector for sector C1, the information relating the sector C2 was erased from SDL 2000 when sector C2 became defective. This is to say, whereas the registration of a same number of entries as defective sectors (five) was necessary under the prior art, the present embodiment, like the second embodiment, can execute the same defect management using only three entries in SDL 2000.

If the host computer requests access to sector B1, the optical disk device is set so as perform accessing based on SDL 2000 in the same way as in the second embodiment. This is to say, optical disk device is able to execute defect management based on SDL 2000 without information relating to defective replacement sectors B2 and C2 being present in SDL 2000.

The following is an explanation of the reason for providing next spare sector pointer information 2002 in SDL 2000.

Here, SDL 2000 is similar to SDL 1700 in the second embodiment in that if it is composed of only header 2001 and entries 2003, then when there is a lack of usable spare sector in a group, it is no longer possible to borrow a spare sector from another group. Accordingly, by providing SDL 2000 with next spare sector pointer information 2002, then, in the same way as in the second embodiment, even when the rewritable zone is divided into a plurality of groups, a spare sector in another group can be used as the replacement sector when there is a lack of usable spare sectors in a given group.

However, the present embodiment differs from the second embodiment in that the SDL stores the position of the next usable spare sector in addition to storing information showing whether there is a lack of a usable spare sector in a group.
(Operation of the Optical Disk Device)

The following is an explanation of the processing of the optical disk device for the assignment of a replacement sector when the sector on the optical disk to be accessed by the host computer is a defective sector. It should be noted here that the construction of the optical disk device in the present embodiment is the same as in the first embodiment. However, the control program installed in the main control unit 1308 is different to that in the first embodiment so that the replacement method executed by the main control unit 1308 is different to the first embodiment.

The flowchart for the assignment of the replacement sector is the same as that in shown in FIG. 14 for the first embodiment, except for the differences in the details of the process shown as step S1401 in FIG. 14.

Figure 22:
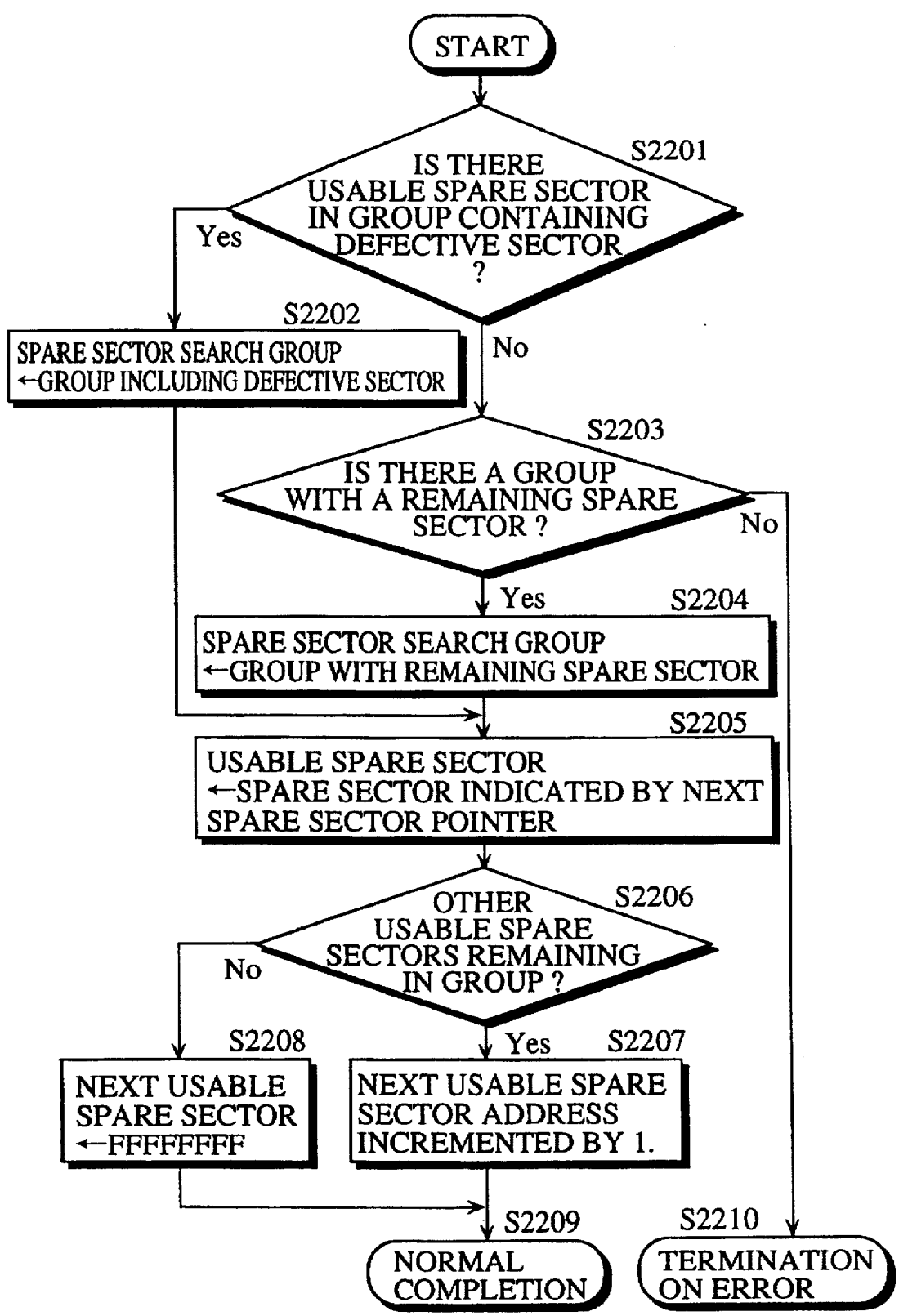
FIG. 22 is a flowchart showing the search process for a usable spare sector under the third embodiment of the present invention.

FIG. 22 is a flowchart which shows the processing executed in the search for a usable spare sector and will be used to explain the details of the processing executed in step S1401 in the third embodiment of the present invention. It should be noted here that in the same way as the ISO Standard, the order in which spare sectors are used as replacement sector is a rising order based on the sector addresses.

First, optical disk device 1302 refers to next spare sector pointer information 2002 and determines whether there is a usable spare sector in the group to which the defective sector belongs (step S2201). This determination is executed by judging whether FFFFFFFF in hexadecimal is present in next spare sector pointer information 2002 at the entry corresponding to the group in question.

If it determines that there is a usable spare sector, the present group is set as the group to have its spare sectors searched (step S2202).

On the other hand, if it determines that there is no usable spare sector, it determines whether there is another group which has a usable spare sector (step S2203), with the process ending with an error if there is no such group (step S2210).

If there is a group with a usable spare sector, the group in question is set as the group to have its spare sectors searched (step S2204).

A spare sector in the selected group obtained by retrieving next spare sector pointer information 2002 for the group is then set as the usable spare sector candidate (S2205).

After this, it is determined whether the usable spare sector candidate is the spare sector with the highest address in the chosen group, which is to say whether any other usable spare sectors are remaining in the present group (step S2206).

If, as a result, another usable spare sector is remaining in the chosen group, the address of the spare sector following the usable spare sector candidate is written into the position in next spare sector pointer information 2002 for this group (step S2207). If this is not the case, FFFFFFFF in hexadecimal is written into the position in next spare sector pointer information 2002 for this group (step S2208), showing that there is a lack of usable spare sectors in the chosen group.

By means of the above process, defective sectors can be replaced using a spare sector belonging to any other group and not just a spare sector in a same group. It should be noted here that the details of the processing shown in the SDL updating process in FIG. 14 (step S1403) are the same as those in the first embodiment.

As described above, the third embodiment, in addition to the advantages of the first embodiment, has the ability to perform flexible defect management wherein for an information storage device whose rewritable zone is divided into a plurality of groups, in assigning a replacement sector for a defective sector, a spare sector can be borrowed from another group when there is a lack of usable spare sectors in a present group.

While there is the slight disadvantage over the second embodiment that the SDL is larger, there is the advantage that high-speed defect management is achieved due to the omission of a search for a next usable spare sector.
Fourth Embodiment The following is an explanation of the fourth embodiment of the present invention with reference to the drawings.

The present embodiment relates to a defect management method which is adapted to a rewritable zone composed of a plurality of groups in the same way as in the second and third embodiments, with the feature about not having information in the SDL relating to spare sectors for each group being the same as in the first embodiment.

Figure 4:
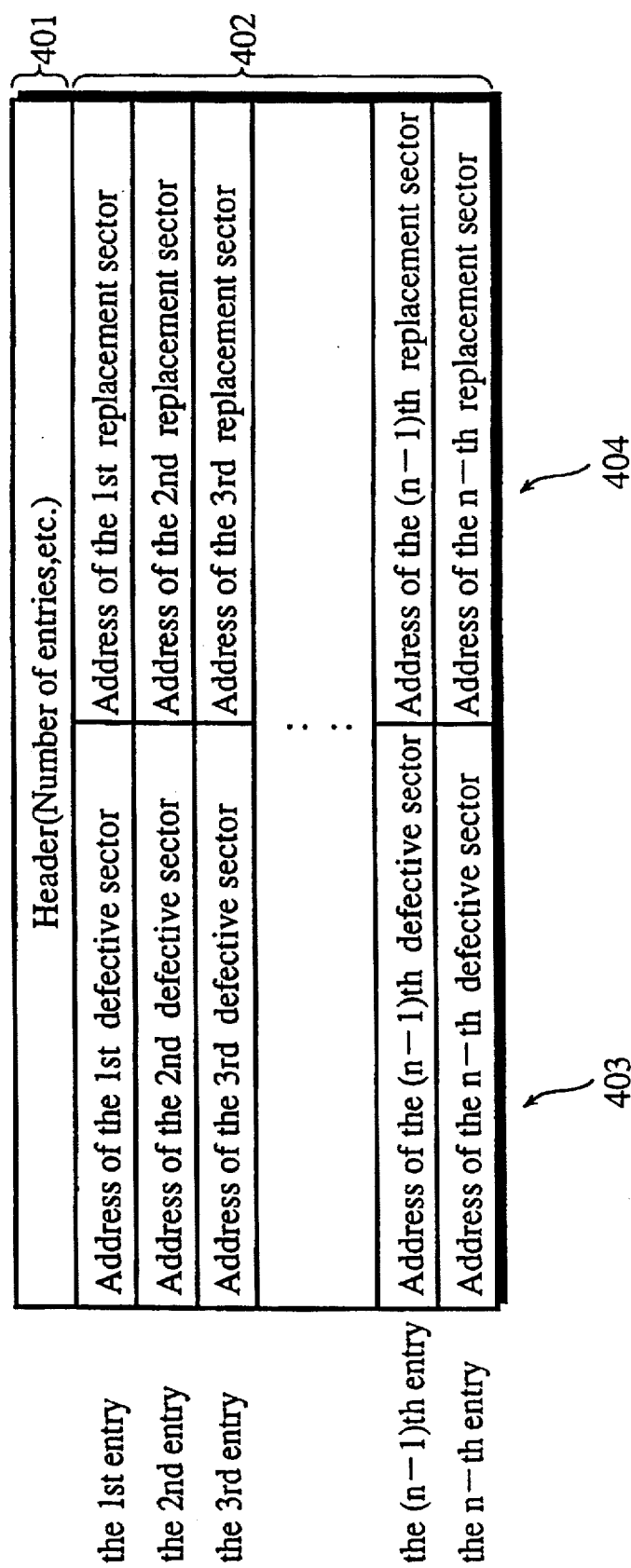
FIG. 4 is a figure showing the composition of an SDL for a prior art example.

The layout of the data zone and the composition of the SDL of the optical disk to which the present embodiment relates are the same as the prior art shown in FIGS. 2 and 4, with the rewritable zone being divided into a plurality of groups. Also, the physical arrangement of tracks and sectors in the data zone of the optical disk in the present embodiment is the same as that shown in FIG. 3 of the prior art section.

FIGS. 23A and 23B are conception figures for the linear replacement algorithm in the fourth embodiment of the present invention, with FIG. 23A being a layout figure showing a part of the rewritable zone. This figure is the same as FIGS. 18A and 21A in the second and third embodiments and so that the same defective sectors are present as before.

FIG. 23B shows the content of the SDL. As can be seen from FIG. 23B, information showing the replacement of sector A1 with sector A2, information showing the replacement of sector B1 with sector B3, information showing the replacement of sector C1 with sector C3, and information showing that sector C2 is replaced by itself (meaning that it is the last replacement sector in a group and that it is a defective sector) is registered.

However, in the same way as in the second embodiment, information showing that sector B2 is a replacement sector which has become defective is not registered. This is because although sector B2 was originally registered as a replacement sector for sector B1, the information relating the sector B2 was erased from SDL 2000 when sector B2 became defective.

On the other hand, sector C2 was originally registered as a replacement sector for sector C1, and although this sector, too, has since become defective, sector C2 is the final sector in the group, so that the information for sector C2 has been kept in the SDL.

Here, accessing by the optical disk device when the host computer requests access to a sector is executed based on the SDL in the same way as in the second embodiment. This is to say, optical disk device is able to execute defect management based on the SDL without information relating to replacement sector B2 which became defective being present in the SDL.

As can be seen in FIG. 23B, since there is an entry for defective sector C2, the present embodiment can perform defect management when the rewritable zone is divided into a number of groups, so that a spare sector in another group can be used as the replacement sector when there is a lack of usable spare sectors in a given group, even though there are no areas in the SDL which correspond to the spare sector lack information 1702 in the second embodiment or next spare sector pointer information 2002 in the third embodiment.

(Operation of the Optical Disk Device)

The following is an explanation of the processing of the optical disk device for the assignment of a replacement sector when the sector on the optical disk to be accessed by the host computer is a defective sector. It should be noted here that the construction of the optical disk device in the present embodiment is the same as that in the first embodiment. However, the control program installed in the main control unit 1308 is different to that in the first embodiment so that the replacement method executed by the main control unit 1308 is different to the first embodiment.

Figure 8:
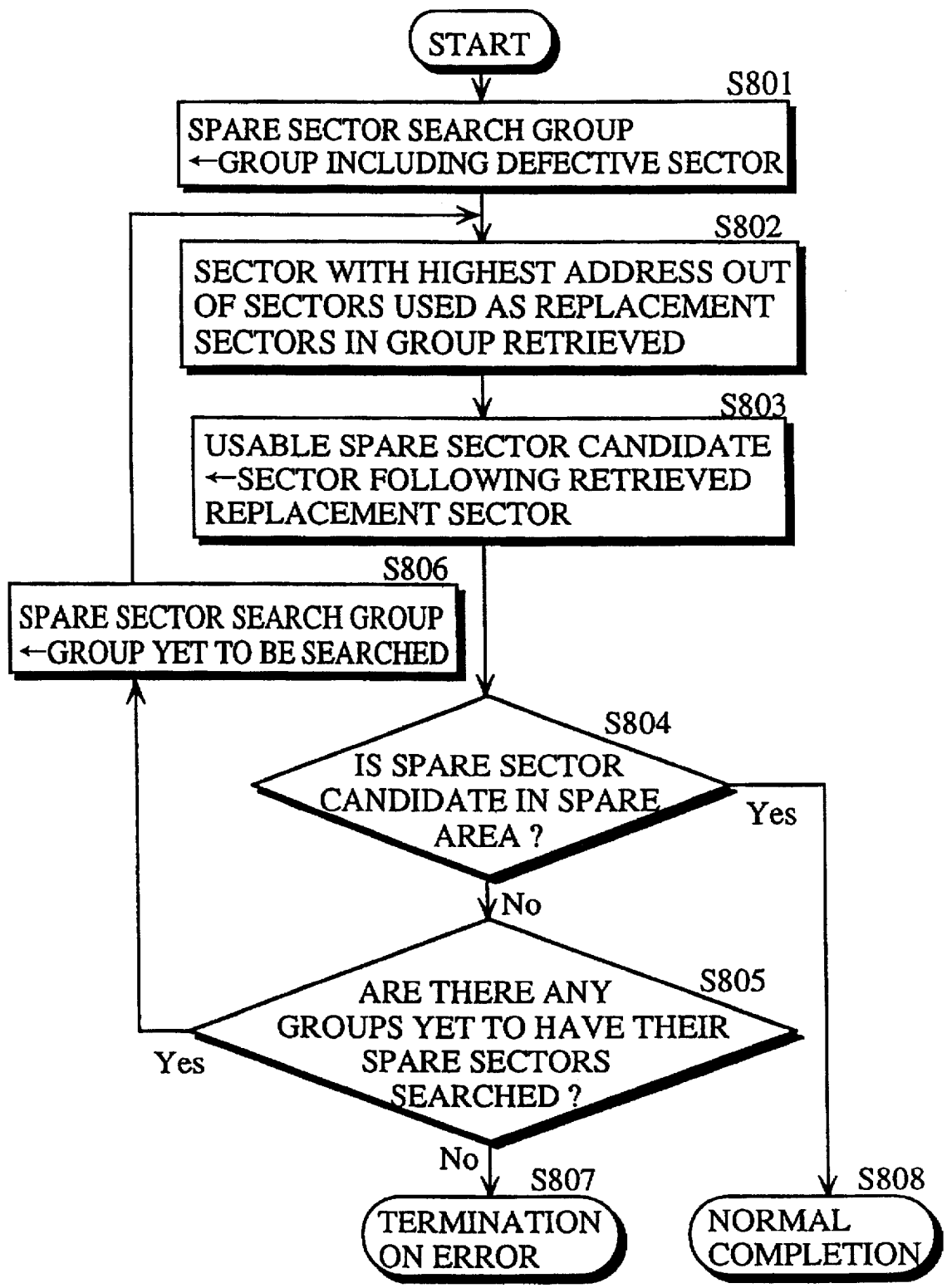
FIG. 8 is a flowchart for the search process for a usable spare sector for a prior art example.
Figure 9:
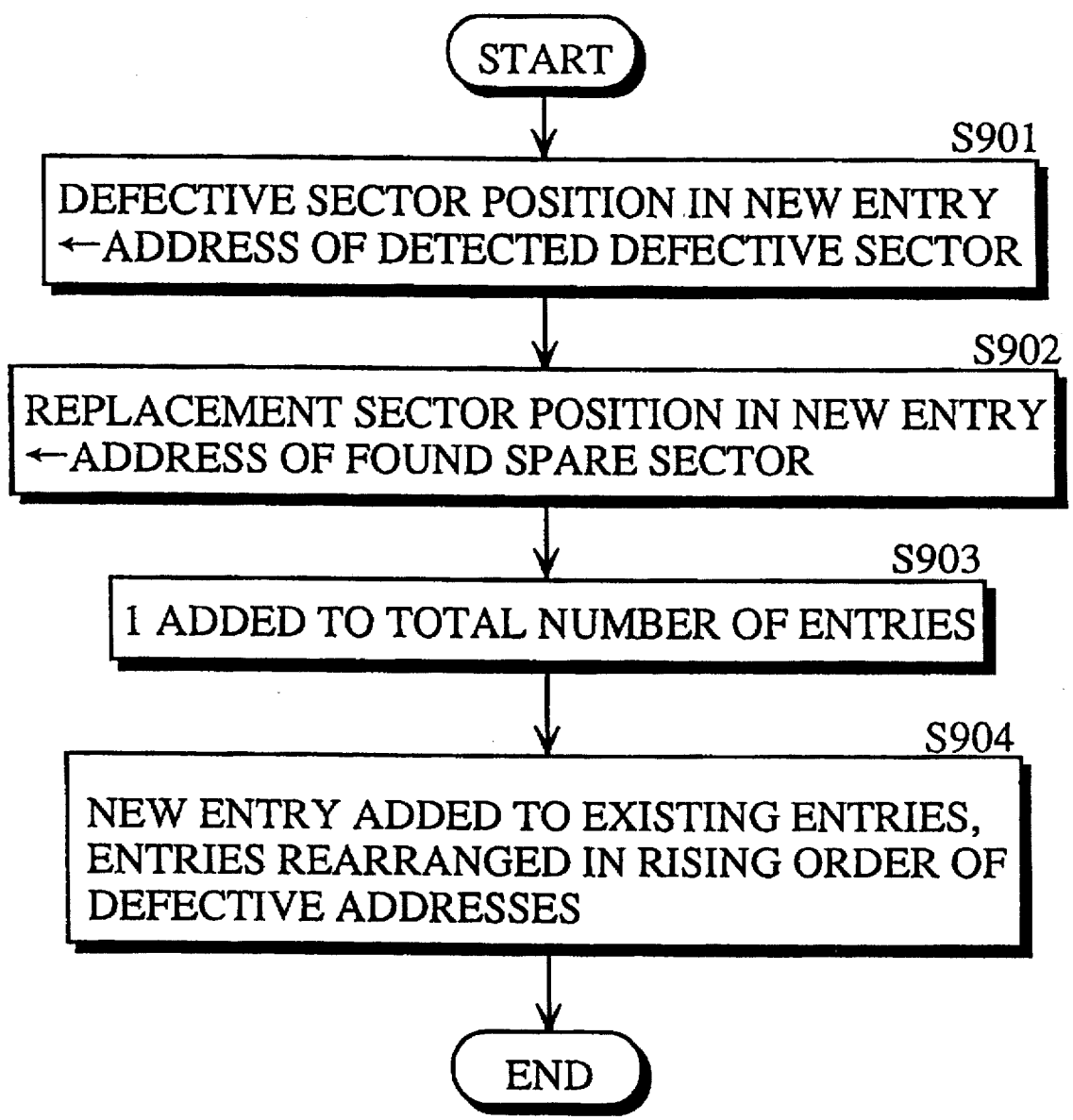
FIG. 9 is a flowchart for the defect list updating process for a prior art example.
Figure 10:
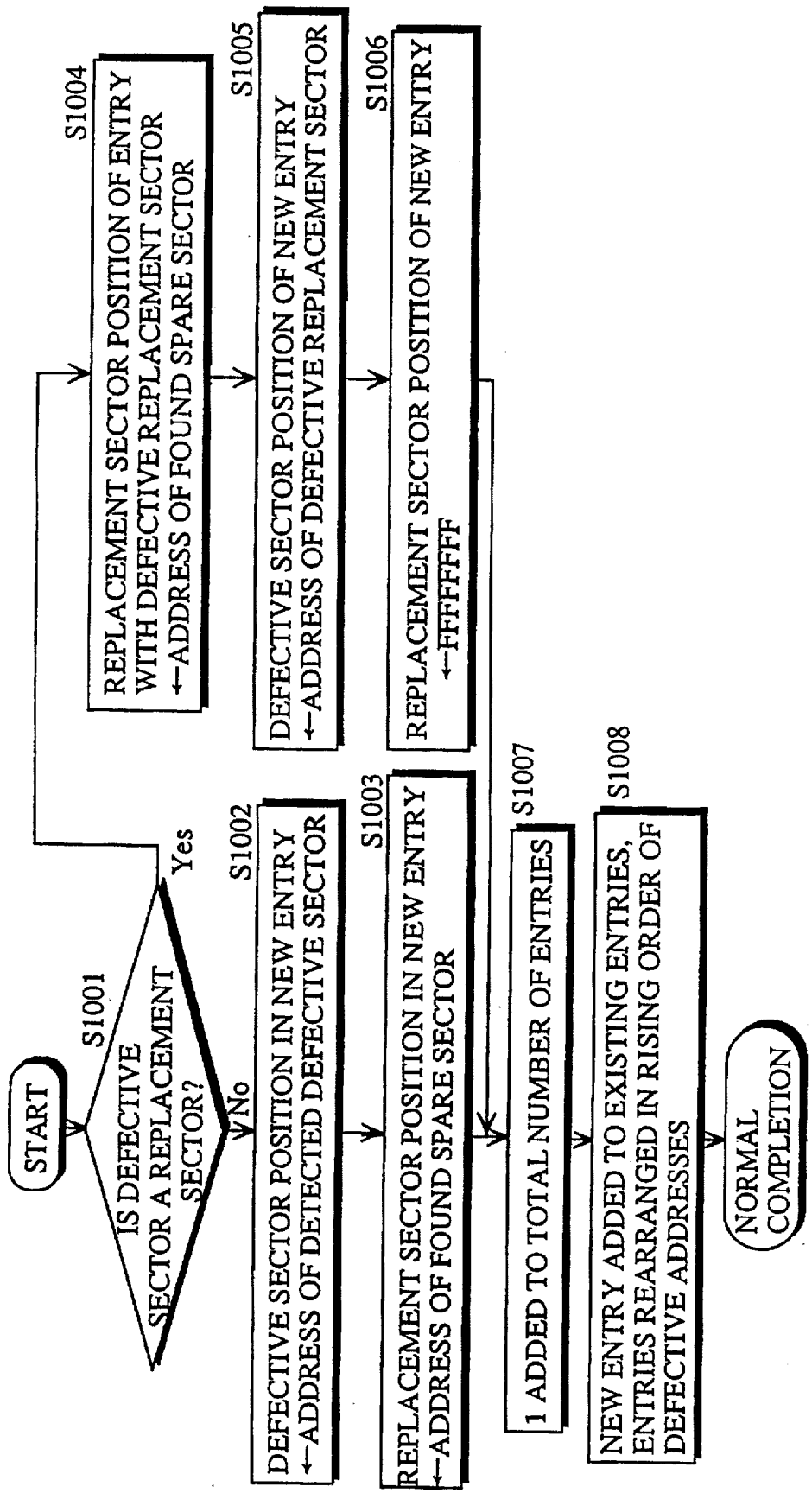
FIG. 10 is a flowchart for the defect list updating process for a prior art example.

The flowchart for the assignment of the replacement sector is the same as that in shown in FIG. 14 for the first embodiment. Here, the details of the process shown as step S1401 in FIG. 14 are the same as in the search process for a usable spare sector given in FIG. 8 of the prior art section. However, the details of step S1403 in FIG. 14 are different to those in the other embodiments or in the prior art section. Here, FIG. 24 is a flowchart showing the SDL updating process which will be used to explain the details of step S1403 in this fourth embodiment of the present invention.

First, optical disk device 1302 determines whether the detected defective sector is a sector which is already written in the SDL as a replacement sector (step S2401). If, as a result, optical disk device 1302 determines that the detected defective sector is not already written in as a replacement sector, optical disk device 1302 writes the address of the detected defective sector into the defective sector position of a new entry in the SDL (step S2402). Next, optical disk device 102 writes the address of the spare sector found in step S1401 into the replacement sector position in the new entry (step S2403).

On the other hand, if optical disk device 1302 determines that the detected defective sector is already written in as a replacement sector, optical disk device 1302 writes the address of the spare sector found in step S1401 into the replacement sector position of the entry which includes the defective sector as its replacement sector (step S2404).

Next, optical disk device 1302 determines whether the replacement sector which has become defective is the final spare sector in that group (step S2405), completing the process as normal if this is not the case (step S2411).

If optical disk device 1302 determines that the replacement sector which has become defective is the final spare sector in that group, then it writes the address of this defective replacement sector into both the defective sector position and the replacement sector position of a new entry (steps S2406, S2407).

Next, optical disk device 1302 determines whether the total number of entries already recorded in the SDL is below the maximum number which can be recorded (step S2408), with the process ending with an error if the number of entries has reached the maximum number (step S2412).

On the other hand, if the total number of entries is below the maximum number, optical disk device 1302 increases the total number of entries by one (step S2409) and rearranges the new entry along with the existing entries so that the addresses written into defective sector positions are in rising order (step S2410).

As described above, the fourth embodiment of the present invention, in addition to the advantages of the first embodiment, has the ability to perform flexible defect management wherein for an information storage device whose rewritable zone is divided into a plurality of groups, in assigning a replacement sector for a defective sector, a spare sector can be borrowed from another group when there is a lack of usable spare sectors in a present group. Also, when compared to the second and third embodiments, since the fundamental construction of the SDL is the same as that in the prior art, there is the additional advantage of favorable interchangeability between this embodiment and the prior art.

The defect management method of the present invention and the optical disk device and information recording medium for achieving this method have been described with reference to the embodiments above, although it should be clear that the present invention is not limited to these embodiments. Three example modifications are described below.

1. The above embodiments describe an information recording medium composed of an optical disk, although the present invention is not limited to the use of such so that other recording media, such as magnetic disks, can also be used.

2. In the SDL in the second and third embodiments, the spare sector lack information 1702 or next spare sector pointer information 2002 were described as being located directly after the header, although the present invention is not limited to the use of such order.

3. In the second and third embodiments, the rewritable zone of the optical disk was described as being divided in to 32 groups, although the present invention is not limited to such number. Here, it is only necessary for the spare sector lack information 1702 or next spare sector pointer information 2002 to have a storage capacity which is sufficient for the information which corresponds to all of the groups provided in the rewritable zone.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information recording medium for which information can be recorded and reproduced in units of one sector, comprising:

a plurality of groups, wherein each group is made up of
a data area which is a collection of sectors to be used for recording new information and a spare area which is a collection of sectors for replacing defective sectors which appear on the information recording medium;

a defect list which is a recording area for a list which is used to manage the defective sectors; and a spare exhaustion information area for storing a set of exhaustion information for each of the groups;

wherein each sector in each spare area is used in ascending order of sector identification number;

wherein there is at least one defective sector in the spare area;

wherein the defect list stores pairings of an identification number of a defective sector in one of the data area and the spare area and an identification number of a non-defective sector in the spare area which is used to replace the defective sector; and wherein each set of exhaustion information in the spare exhaustion information area shows whether a sector which can be used as a replacement sector is left in the spare area of the group to which the set of exhaustion information relates.

2. The information recording medium of claim 1, wherein a maximum number of pairings which can be recorded in the defect list is larger than a number of sectors which compose a spare area of each group.

3. The information recording medium of claim 2, wherein the spare exhaustion information area is recorded on the information recording medium at a position neighboring the defect list.

4. An information recording medium for which information can be recorded and reproduced in units of one sector, comprising:

a plurality of groups, wherein each group is made up of a data area which is a collection of sectors to be used for recording new information and a spare area which is a collection of sectors for replacing defective sectors which appear on the information recording medium;

a defect list which is a recording area for a list which is used to manage the defective sectors; and a next spare sector pointer area which is a collection of pointers, each of which is related to one of the groups;

wherein each sector in each spare area is used in ascending order of sector identification number;

wherein there is at least one defective sector in the spare area;

wherein the defect list stores pairings of an identification number of a defective sector in one of the data area and the spare area and an identification number of a non-defective sector in the spare area which is used to replace the defective sector; and wherein each pointer recorded in the next spare sector pointer area includes one of a sector identification number of a sector which belongs to the spare area of a corresponding group and which is a next sector to be assigned as a replacement sector and information showing that there is no sector which can be assigned as a replacement sector in a group.

5. The information recording medium of claim 4, wherein a maximum number of pairings which can be recorded in the defect list is larger than a number of sectors which compose a spare area of each group.

6. The information recording medium of claim 5, wherein the next spare sector pointer area is recorded on the information recording medium at a position neighboring the defect list.

7. An information recording medium for which information can be recorded and reproduced in units of one sector, comprising:

a plurality of groups, wherein each group is made up of a data area which is a collection of sectors to be used for recording new information and a spare area which is a collection of sectors for replacing defective sectors which appear on the information recording medium; and a defect list which is a recording area for a list which is used to manage the defective sectors;

wherein each sector in each spare area is used in ascending order of sector identification number;

wherein there is at least one defective sector in the spare area; and wherein the defect list stores pairings of an identification number of a defective sector in one of the data area and the spare area and an identification number of a non-defective sector in the spare area which is used to replace the defective sector, and a pairing of identification number for a defective sector which belongs to the spare area in a group whose spare area does not include a sector which can be used as a replacement sector for the defective sector and a copy of the identification information for the defective sector.

8. The information recording medium of claim 7, wherein a maximum number of pairings which can be recorded in the defect list is larger than a number of sectors which compose a spare area of each group.

9. A management method for an information storage medium, said management method comprising:

a replacement sector assigning step for assigning, when a defective sector is found, a sector in the spare area which is to be used for replacing the defective sector;

a defect list updating step for updating a content of the defect list based on an assigning in the replacement sector assigning step; and a spare exhaustion information updating step for updating a content of the spare exhaustion information area based on an assigning in the replacement sector assigning step;

wherein the replacement sector assigning step includes:

an exhaustion information reading step for reading, when a defective sector has been found, a set of exhaustion information stored at a position in the spare exhaustion information area which corresponds to a group to which the defective sector belongs;

an exhaustion information judging step for judging, from the exhaustion information read in the exhaustion information reading step, whether a sector which can be used as a new replacement sector is present in the spare area of the corresponding group;

a first replacement sector determining step for determining the new replacement sector from the spare area of the group when the exhaustion information judging step judges that an available spare sector is present; and a second replacement sector determining step for determining, when the exhaustion information judging step judges that an available spare sector is not present, another group which includes a sector that can be used as the new replacement sector by reading exhaustion information stored at another recording position in the spare exhaustion information area and for selecting the new replacement sector from the spare area of the other group;

wherein the defect list updating step includes:

an area judging step for judging whether the defective sector belongs to the data area or to the spare area;

a new defect entry registration step for writing, when the area judging step judges that the defective sector belongs to the data area, identification information for the defective sector paired together with identification information for a replacement sector assigned in the replacement sector assigning step into a new entry in the defect list; and a defect entry overwriting step for overwriting, when the area judging step judges that the defective sector belongs to the spare area, identification information for a replacement sector assigned in the replacement sector assigning step into an entry in the defect list into which identification information for the defective sector is written, in doing so writing no information aside from identification numbers of sectors in the one of the data area and the spare area into the defect list;

and wherein the spare exhaustion information updating step includes:

an exhaustion judging step for judging whether an assignable sector is left in the spare area of the group after assigning has been performed in the replacement sector assigning step; and an exhaustion information updating step for updating, when the exhaustion judging step judges that no assignable sector is remaining, the exhaustion information at the recording position in the spare exhaustion information area corresponding to the group to show that no assignable sector is left.

10. The defect management method of claim 9, wherein a maximum number of pairings which can be recorded in the defect list is larger than a number of sectors which compose a spare area of each group.

11. A defect management method for an information recording medium, comprising:

a replacement sector assigning step for assigning, when a defective sector is found, a sector in the spare area which is to be used for replacing the defective sector;

a defect list updating step for updating a content of the defect list based on an assigning in the replacement sector assigning step; and a next spare sector pointer area updating step for updating a content of the next spare sector pointer area based on an assigning in the replacement sector assigning step;

wherein the replacement sector assigning step includes:

a pointer reading step for reading, when a defective sector is found, a pointer which is stored a recording position in the next spare sector pointer area corresponding to a group which includes the defective sector;

a pointer judging step for judging, from the pointer read in the pointer reading step, whether the pointer has a value which indicates that a sector which can be assigned as a new replacement sector is not present in the spare area of the group which includes the defective sector;

a third replacement sector determining step for determining a new replacement sector corresponding to a pointer of another group which is found by reading a pointer stored in a different area to the next spare area indicated area, when the pointer judged in the pointer judging step indicates that no available spare sector is present; and a fourth replacement sector determining step for determining, when the exhaustion information judging step judges that an available spare sector is present, the sector indicated by the pointer as the new replacement sector;

wherein the defect list updating step includes:

an area judging step for judging whether the defective sector belongs to the data area or to the spare area;

a new defect entry registration step for writing, when the area judging step judges that the defective sector belongs to the data area, identification information for the defective sector paired together with identification information for a replacement sector assigned in the replacement sector assigning step into a new entry in the defect list; and a defect entry overwriting step for overwriting, when the area judging step judges that the defective sector belongs to the spare area, identification information for a replacement sector assigned in the replacement sector assigning step into an entry in the defect list into which identification information for the defective sector is written, in doing so writing no information aside from identification numbers of sectors in the one of the data area and the spare area into the defect list;

and wherein the next spare sector pointer area updating step includes:

an exhaustion judging step for judging whether an assignable sector is still remaining in the spare area of the group after assigning has been performed in the replacement sector assigning step;

a first pointer updating step for updating, when the exhaustion judging step judges that an assignable sector is remaining, the pointer at the recording position in the next spare sector pointer area corresponding to the group so as to show identification information for a next assignable sector which follows a sector determined in the replacement sector assigning step; and a second pointer updating step for updating, when the exhaustion judging step judges that an assignable sector is not remaining, the pointer at the recording position in the next spare sector pointer area corresponding to the group so as to show that no assignable sector is present.

12. The defect management method of claim 11, wherein a maximum number of pairings which can be recorded in the defect list is larger than a number of sectors which compose a spare area of each group.

13. A defect management method for an information recording method, comprising:

a replacement sector assigning step for searching, when a defective sector is found, through sector identification numbers in the spare area of a same group as the defective sector in ascending order for a sector which is to be used for replacing the defective sector, for setting a sector found in the search as a replacement sector and for searching a different group which has not yet been searched for a replacement sector when the search is unsuccessful; and a defect list updating step for updating a content of the defect list based on an assigning in the replacement sector assigning step;

wherein the defect list updating step includes:

an area judging step for judging whether the defective sector belongs to the data area or to the spare area;

a new defect entry registration step for writing, when the area judging step judges that the defective sector belongs to the data area, identification information for the defective sector paired together with identification information for a replacement sector assigned in the replacement sector assigning step into a new entry in the defect list;

a final sector judging step for judging, when the area judging step judges that the defective sector belongs to the spare area, whether the defective sector is a final assignable sector in the spare area of the group;

a final sector recording step for writing, when the final sector judging step judges that the defective sector is the final sector in the group, a pairing of pieces of identical identification information for the defective sector into a new recording position in the defect list so that entries in the defect list are listed in an ascending order of identification numbers of defective sectors; and a defect overwriting step for writing into the defect list, when the final sector judging step judges that the defective sector is not the final sector in the group, an identification number of a replacement sector assigned in the replacement sector assigning step over the identification number of the defective sector which has been replaced.

14. The defect management method of claim 13, wherein a maximum number of pairings which can be recorded in the defect list is larger than a number of sectors which compose a spare area of each group.

15. A management apparatus for an information storage medium, said management apparatus comprising:

replacement sector assigning means for assigning, when a defective sector is found, a sector in the spare area which is to be used for replacing the defective sector;

defect list updating means for updating a content of the defect list based on an assigning by the replacement sector assigning means; and spare exhaustion information updating means for updating a content of the spare exhaustion information area based on an assigning by the replacement sector assigning means;

wherein the replacement sector assigning means includes:

exhaustion information reading means for reading, when a defective sector has been found, a set of exhaustion information stored at a position in the spare exhaustion information area which corresponds to a group to which the defective sector belongs;

exhaustion information judging means for judging, from the exhaustion information read by the exhaustion information reading means, whether a sector which can be used as a new replacement sector is present in the spare area of the corresponding group;

first replacement sector determining means for determining the new replacement sector from the spare area of the group when the exhaustion information judging means judges that an available spare sector is present; and second replacement sector determining means for determining, when the exhaustion information judging means judges that an available spare sector is not present, another group which includes a sector that can be used as the new replacement sector by reading exhaustion information stored at another recording position in the spare exhaustion information area and for selecting the new replacement sector from the spare area of the other group;

wherein the defect list updating means includes:

area judging means for judging whether the defective sector belongs to the data area or to the spare area;

new defect entry registration means for writing, when the area judging means judges that the defective sector belongs to the data area, identification information for the defective sector paired together with identification information for a replacement sector assigned by the replacement sector assigning means into a new entry in the defect list; and defect entry overwriting means for overwriting, when the area judging means judges that the defective sector belongs to the spare area, identification information for a replacement sector assigned by the replacement sector assigning means into an entry in the defect list into which identification information for the defective sector is written, in doing so writing no information aside from identification numbers of sectors in the one of the data area and the spare area into the defect list;

and wherein the spare exhaustion information updating means includes:

exhaustion judging means for judging whether an assignable sector is left in the spare area of the group after assigning has been performed by the replacement sector assigning means; and exhaustion information updating means for updating, when the exhaustion judging means judges that no assignable sector is remaining, the exhaustion information at the recording position in the spare exhaustion information area corresponding to the group to show that no assignable sector is left.

16. The defect management method of claim 15, wherein a maximum number of pairings which can be recorded in the defect list is larger than a number of sectors which compose a spare area of each group.

17. A defect management apparatus for an information storage medium, comprising:

replacement sector assigning means for assigning, when a defective sector is found, a sector in the spare area which is to be used for replacing the defective sector;

defect list updating means for updating a content of the defect list based on an assigning by the replacement sector assigning means; and next spare sector pointer area updating means for updating a content of the next spare sector pointer area based on an assigning by the replacement sector assigning means;

wherein the replacement sector assigning means includes:

pointer reading means for reading, when a defective sector is found, a pointer which is stored at a recording position in the next spare sector pointer area corresponding to a group which includes the defective sector;

pointer judging means for judging, from the pointer read by the pointer reading means, whether the pointer has a value which indicates that a sector which can be assigned as a new replacement sector is not present in the spare area of the group which includes the defective sector;

third replacement sector determining means for determining a new replacement sector corresponding to a pointer of another group which is found by reading a pointer stored in a different area to the next spare area indicated area, when the pointer judged by the pointer judging means indicates that no available spare sector is present; and fourth replacement sector determining means for determining, when the exhaustion information judging means judges that an available spare sector is present, the sector indicated by the pointer as the new replacement sector;

wherein the defect list updating means includes:

area judging means for judging whether the defective sector belongs to the data area or to the spare area;

new defect entry registration means for writing, when the area judging means judges that the defective sector belongs to the data area, identification information for the defective sector paired together with identification information for a replacement sector assigned by the replacement sector assigning means into a new entry in the defect list; and defect entry overwriting means for overwriting, when the area judging means judges that the defective sector belongs to the spare area, identification information for a replacement sector assigned by the replacement sector assigning means into an entry in the defect list into which identification information for the defective sector is written, in doing so writing no information aside from identification numbers of sectors in the one of the data area and the spare area into the defect list;

and wherein the next spare sector pointer area updating means includes:

exhaustion judging means for judging whether an assignable sector is still remaining in the spare area of the group after assigning has been performed by the replacement sector assigning means;

a first pointer updating means for updating, when the exhaustion judging means judges that an assignable sector is remaining, the pointer at the recording position in the next spare sector pointer area corresponding to the group so as to show identification information for a next assignable sector which follows a sector determined by the replacement sector assigning means; and a second pointer updating means for updating, when the exhaustion judging means judges that an assignable sector is not remaining, the pointer at the recording position in the next spare pointer area corresponding to the group so as to show that no assignable sector is present.

18. The defect management method of claim 17, wherein a maximum number of pairings which can be recorded in the defect list is larger than a number of sectors which compose a spare area of each group.

19. A management apparatus for an information storage medium, comprising:

replacement sector assigning means for assigning, when a defective sector is found, through sector identification numbers in the spare area of a same group as the defective sector in ascending order for a sector which is to be used for replacing the defective sector, for setting a sector found in the search as a replacement sector and for searching a different group which has not yet been searched for a replacement sector when the search is unsuccessful; and defect list updating means for updating a content of the defect list based on an assigning by the replacement sector assigning means;

wherein the defect list updating means includes:

area judging means for judging whether the defective sector belongs to the data area or to the spare area;

new defect entry registration means for writing, when the area judging means judges that the defective sector belongs to the data area, identification information for the defective sector paired together with identification information for a replacement sector assigned by the replacement sector assigning means into a new entry in the defect list;

final sector judging means for judging, when the area judging means judges that the defective sector belongs to the spare area, whether the defective sector is a final assignable sector in the spare area of the group;

final sector recording means for writing, when the final sector judging means judges that the defective sector is the final sector in the group, a pairing of pieces of identical identification information for the defective sector into a new recording position in the defect list so that entries in the defect list are listed in an ascending order of identification numbers of defective sectors; and defect overwriting means for writing into the defect list, when the final sector judging means judges that the defective sector is not the final sector in the group, an identification number of a replacement sector assigned by the replacement sector assigning means over the identification number of the defective sector which has been replaced.

20. The management apparatus of claim 19, wherein a maximum number of pairings which can be recorded in the defect list is larger than a number of sectors which compose a spare area of each group.

21. A management system for information storage medium comprising:

an information recording medium for which information can be recorded and reproduced in units of one sector, including;

a plurality of groups, wherein each group is made up of a data area which is a collection of sectors to be used for recording new information and a spare area which is a collection of sectors for replacing defective sectors which appear on the information recording medium;

a defect list which is a recording area for a list which is used to manage the defective sectors; and a spare exhaustion information area for storing a set of exhaustion information for each of the groups; wherein each sector in each spare area is used in ascending order of sector identification number and there is at least one defective sector in the spare area, the defect list stores pairings of an identification number of a defective sector in one of the data area and the spare area and an identification number of a non-defective sector in the spare area which is used to replace the defective sector, and each set of exhaustion information in the spare exhaustion information area shows whether a sector which can be used as a replacement sector is left in the spare area of the group to which the set of exhaustion information relates; and a management apparatus including;

replacement sector assigning means for assigning, when a defective sector is found, a sector in the spare area which is to be used for replacing the defective sector;

defect list updating means for updating a content of the defect list based on an assigning by the replacement sector assigning means; and spare exhaustion information updating means for updating a content of the spare exhaustion information area based on an assigning by the replacement sector assigning means;

wherein the replacement sector assigning means includes:

exhaustion information reading means for reading, when a defective sector has been found, a set of exhaustion information stored at a position in the spare exhaustion information area which corresponds to a group to which the defective sector belongs;

exhaustion information judging means for judging from the exhaustion information read by the exhaustion information reading means whether a sector which can be used as a new replacement sector is present in the spare area of the corresponding group;

first replacement sector determining means for determining the new replacement sector from the spare area of the group when the exhaustion information judging means judges that an available spare sector is present; and second replacement sector determining means for determining, when the exhaustion information judging means judges that an available spare sector is not present, another group which includes a sector that can be used as the new replacement sector by reading exhaustion information stored at another recording position in the spare exhaustion information area and for selecting the new replacement sector from the spare area of the other group;

wherein the defect list updating means includes:

area judging means for judging whether the defective sector belongs to the data area or to the spare area;

new defect entry registration means for writing, when the area judging means judges that the defective sector belongs to the data area, identification information for the defective sector paired together with identification information for a replacement sector assigned by the replacement sector assigning means into a new entry in the defect list; and defect entry overwriting means for overwriting, when the area judging means judges that the defective sector belongs to the spare area, identification information for a replacement sector assigned by the replacement sector assigning means into an entry in the defect list into which identification information for the defective sector is written, in doing so writing no information aside from identification numbers of sectors in the one of the data area and the spare area into the defect list;

and wherein the spare exhaustion information updating means includes:

exhaustion judging means for judging whether an assignable sector is left in the spare area of the group after assigning has been performed by the replacement sector assigning means; and exhaustion information updating means for updating, when the exhaustion judging means judges that no assignable sector is remaining, the exhaustion information at the recording position in the spare exhaustion information area corresponding to the group to show that no assignable sector is left.

22. The management apparatus of claim 21, wherein a maximum number of pairings which can be recorded in the defect list is larger than a number of sectors which compose a spare area of each group.

23. A management system for information storage medium comprising:

an information recording medium for which information can be recorded and reproduced in units of one sector, including:

a plurality of groups, wherein each group is made up of a data area which is a collection of sectors to be used for recording new information and a spare area which is a collection of sectors for replacing defective sectors which appear on the information recording medium;

a defect list which is a recording area for a list which is used to manage the defective sectors; and a next spare sector pointer area which is a collection of pointers, each of which is related to one of the groups;

wherein each sector in each spare area is used in ascending order of sector identification number and there is at least one defective sector in the spare area; the defect list stores pairings of an identification number of a defective sector in one of the data area and the spare area and an identification number of a nondefective sector in the spare area which is used to replace the defective sector and each pointer recorded in the next spare sector pointer area includes one of a sector identification number of a sector which belongs to the spare area of a corresponding group and which is a next sector to be assigned as a replacement sector and information showing that there is no sector which can be assigned as a replacement sector in a group; and a defect management apparatus including;

replacement sector assigning means for assigning, when a defective sector is found, a sector in the spare area which is to be used for replacing the defective sector;

defect list updating means for updating a content of the defect list based on an assigning by the replacement sector assigning means; and next spare sector pointer area updating means for updating a content of the next spare sector pointer area based on an assigning by the replacement sector assigning means, wherein the replacement sector assigning means includes:

pointer reading means for reading, when a defective sector is found, a pointer which is stored at a recording position in the next spare sector pointer area corresponding to a group which includes the defective sector;

pointer judging means for judging from the pointer read by the pointer reading means whether the pointer has a value which indicates that a sector which can be assigned as a new replacement sector is not present in the spare area of the group which includes the defective sector;

third replacement sector determining step for determining a new replacement sector corresponding to a pointer of another group which is found by reading a pointer stored in a different area to the next spare area indicated area, when the pointer judged in the pointer judging step indicates that no available spare sector is present; and fourth replacement sector determining step for determining, when the exhaustion information judging step judges that an available spare sector is present, the sector indicated by the pointer as the new replacement sector;

wherein the defect list updating step includes:

area judging step for judging whether the defective sector belongs to the data area or to the spare area;

new defect entry registration step for writing, when the area judging means judges that the defective sector belongs to the data area, identification information for the defective sector paired together with identification information for a replacement sector assigned by the replacement sector assigning means into a new entry in the defect list; and a defect entry overwriting means for overwriting, when the area judging means judges that the defective sector belongs to the spare area, identification information for a replacement sector assigned by the replacement sector assigning means into an entry in the defect list into which identification information for the defective sector is written, in doing so writing no information aside from identification numbers of sectors in the one of the data area and the spare area into the defect list;

and wherein the next spare sector pointer area updating means includes:

exhaustion judging means for judging whether an assignable sector is still remaining in the spare area of the group after assigning has been performed by the replacement sector assigning means;

a first pointer updating means for updating, when the exhaustion judging means judges that an assignable sector is remaining, the pointer at the recording position in the next spare sector pointer area corresponding to the group so as to show identification information for a next assignable sector which follows a sector determined by the replacement sector assigning means; and a second pointer updating means for updating, when the exhaustion judging means judges that an assignable sector is not remaining, the pointer at the recording position in the next spare sector pointer area corresponding to the group so as to show that no assignable sector is present.

24. The management apparatus of claim 23, wherein a maximum number of pairings which can be recorded in the defect list is larger than a number of sectors which compose a spare area of each group.

25. A management system for information storage medium comprising:

an information recording medium for which information can be recorded and reproduced in units of one sector, including;

a plurality of groups, wherein each group is made up of a data area which is a collection of sectors to be used for recording new information and a spare area which is a collection of sectors for replacing defective sectors which appear on the information recording medium; and a defect list which is a recording area for a list which is used to manage the defective sectors, wherein each sector in each spare area is used in ascending order of sector identification number, and there is at least one defective sector in the spare area; the defect list stores pairings of an identification number of a defective sector in one of the data area and the spare area and an identification number of a nondefective sector in the spare area which is used to replace the defective sector, and a pairing of identification number for a defective sector which belongs to the spare area in a group whose spare area does not include a sector which can be used as a replacement sector for the defective sector and a copy of the identification information for the defective sector; and a management apparatus including;

replacement sector assigning means for searching, when a defective sector is found, through sector identification numbers in the spare area of a same group as the defective sector in ascending order for a sector which is to be used for replacing the defective sector, for setting a sector found in the search as a replacement sector and for searching a different group which has not yet been searched for a replacement sector when the search is unsuccessful; and defect list updating means for updating a content of the defect list based on an assigning in the replacement sector assigning means;

wherein the defect list updating means includes:

area judging means for judging whether the defective sector belongs to the data area or to the spare area;

new defect entry registration means for writing, when the area judging means judges that the defective sector belongs to the data area, identification information for the defective sector paired together with identification information for a replacement sector assigned by the replacement sector assigning means into a new entry in the defect list;

final sector judging means for judging, when the area judging means judges that the defective sector belongs to the spare area, whether the defective sector is a final assignable sector in the spare area of the group;

final sector recording means for writing, when the final sector judging means judges that the defective sector is the final sector in the group, a pairing of pieces of identical identification information for the defective sector into a new recording position in the defect list so that entries in the defect list are listed in an ascending order of identification numbers of defective sectors; and defect overwriting means for writing into the defect list, when the final sector judging step judges that the defective sector is not the final sector in the group, an identification number of a replacement sector assigned by the replacement sector assigning means over the identification number of the defective sector which has been replaced.

26. The management apparatus of claim 25, wherein a maximum number of pairings which can be recorded in the defect list is larger than a number of sectors which compose a spare area of each group.

* * * * *